United States Patent
Cao et al.

(10) Patent No.: US 10,444,382 B2
(45) Date of Patent: Oct. 15, 2019

(54) IMAGING SYSTEM CONFIGURED TO STATISTICALLY DETERMINE CHARGE SHARING

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/177,664

(22) Filed: Nov. 1, 2018

(65) Prior Publication Data

US 2019/0079202 A1 Mar. 14, 2019

Related U.S. Application Data

(63) Continuation of application No. PCT/CN2016/105808, filed on Nov. 15, 2016.

(51) Int. Cl.
*G01T 1/24* (2006.01)
*G01T 1/16* (2006.01)

(52) U.S. Cl.
CPC ............... *G01T 1/247* (2013.01); *G01T 1/16* (2013.01); *G01T 1/24* (2013.01)

(58) Field of Classification Search
CPC ............... G01T 1/16; G01T 1/24; G01T 1/247
See application file for complete search history.

(56) References Cited

U.S. PATENT DOCUMENTS

2010/0074397 A1 3/2010 Kappler et al.

FOREIGN PATENT DOCUMENTS

| WO | 2015092676 A1 | 6/2015 |
| WO | 2016161542 A1 | 10/2016 |
| WO | 2016161544 A1 | 10/2016 |

*Primary Examiner* — Mark R Gaworecki
(74) *Attorney, Agent, or Firm* — IPro, PLLC; Qian Gu; Na Xu

(57) ABSTRACT

Disclosed herein is a method comprising: exposing an imaging system to a scene of a radiation, the imaging system comprising a radiation detector, wherein a probability of having two or more particles of the radiation from the scene incident on an area of the radiation detector during a frame within a time period of detection is below a threshold; detecting particles of the radiation from the scene with the imaging system; if the imaging system detects two or more particles in the area within the frame, combining signals caused by the two or more particles as a combined signal and recording the combined signal, or disregarding the signals caused by the two or more particles; if the imaging system detects only one particle, recording a signal caused by the only one particle; after an end of the time period of detection, forming an image with signals recorded.

27 Claims, 26 Drawing Sheets

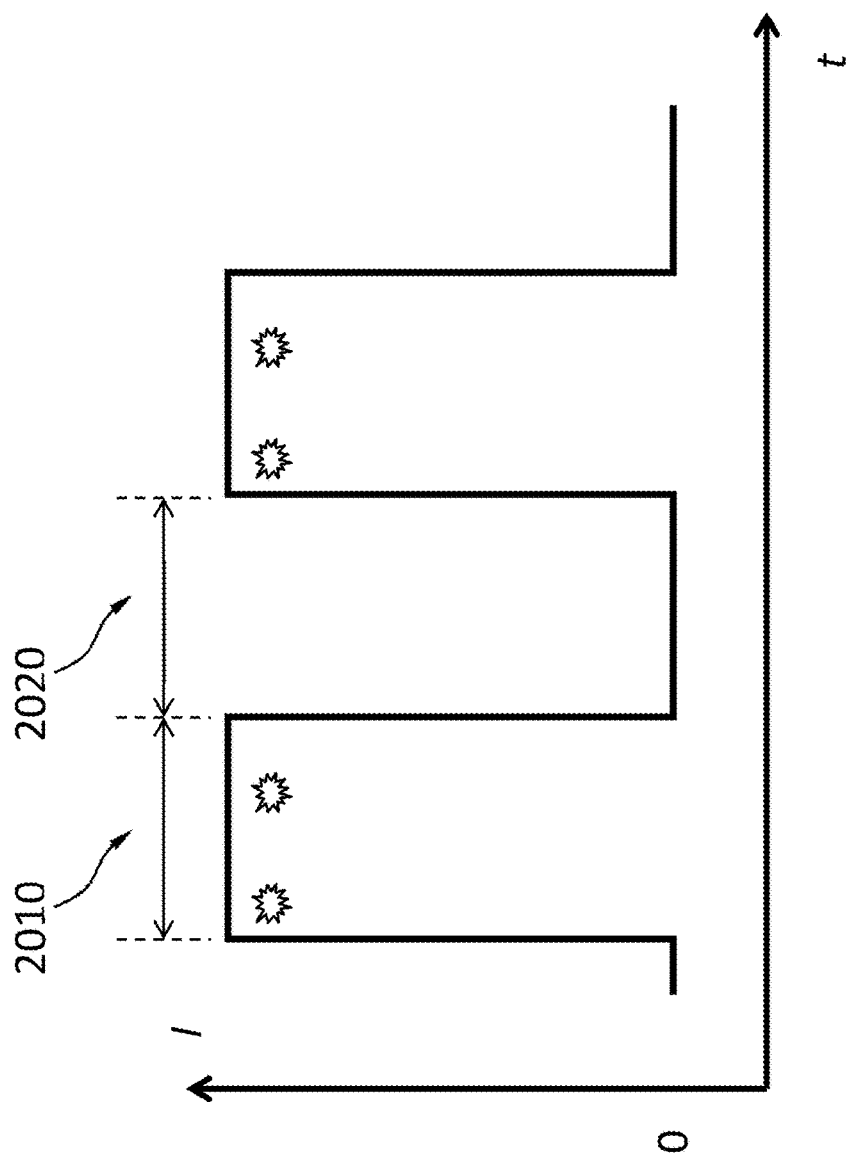

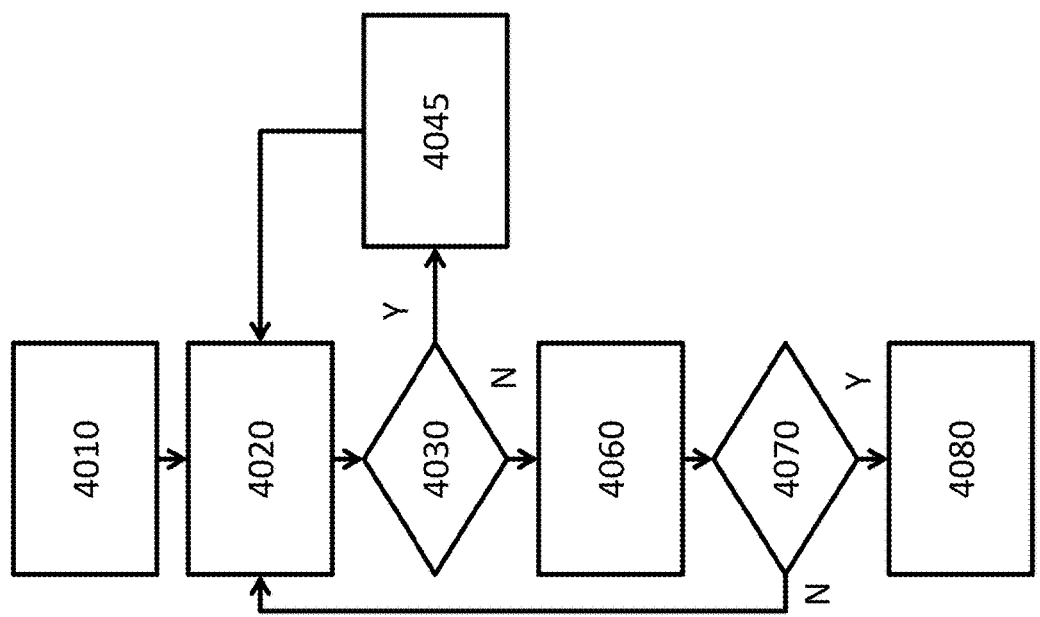

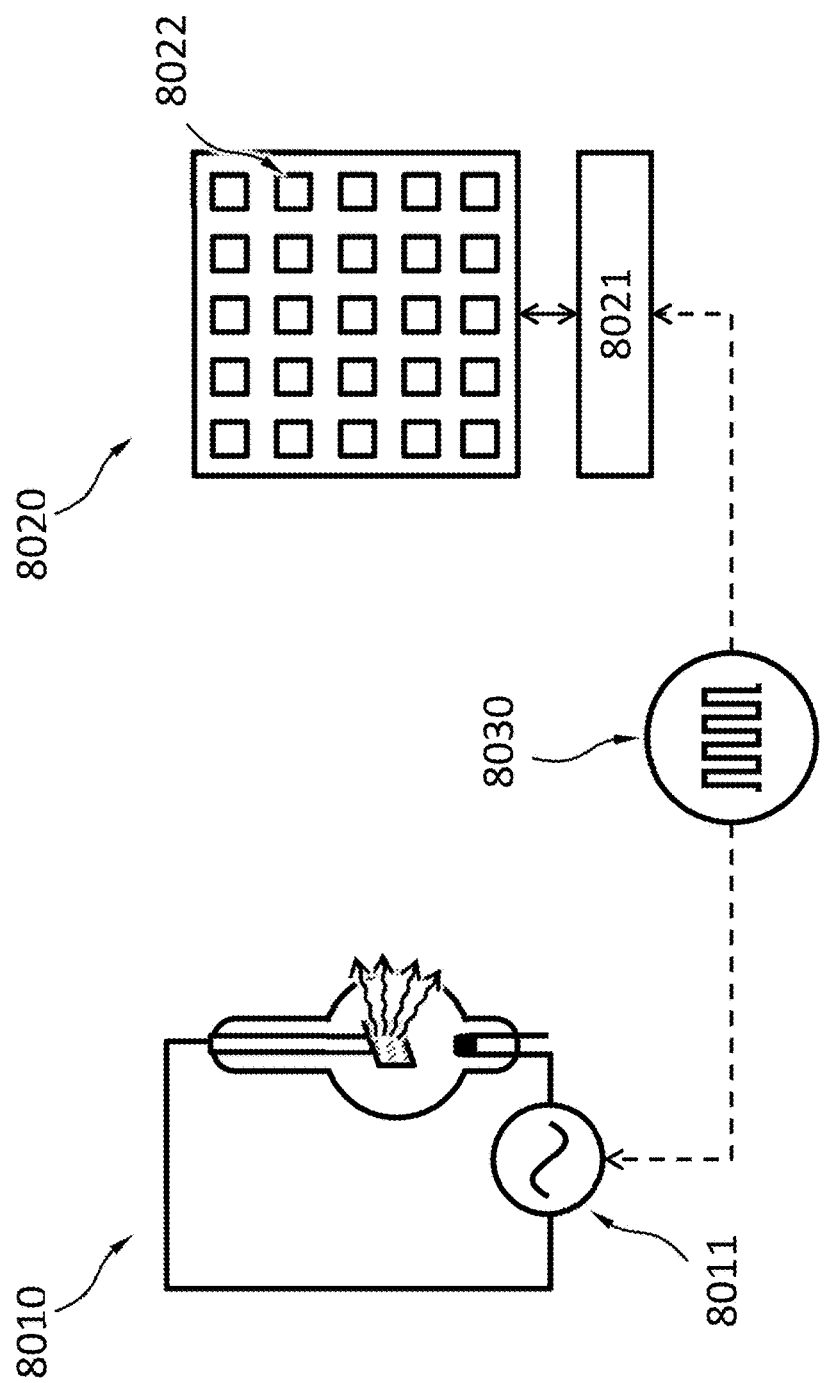

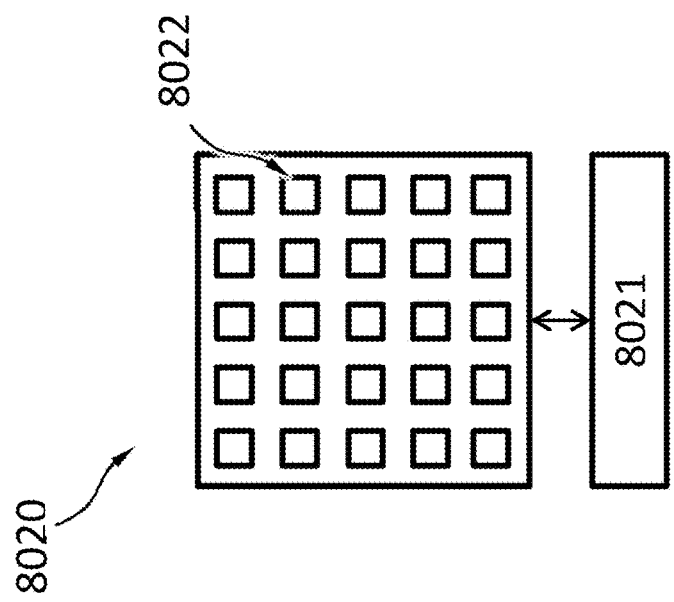
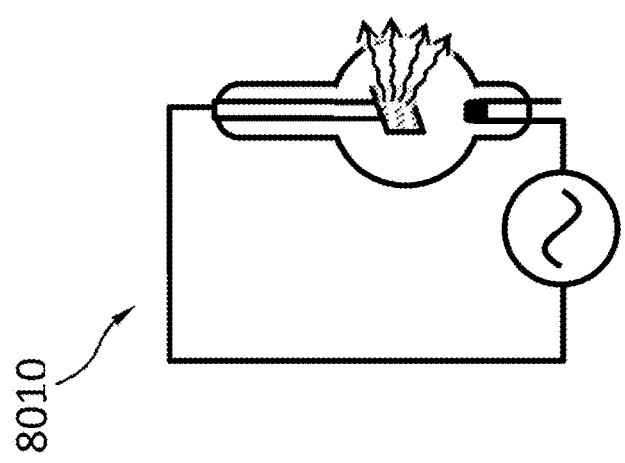
Fig. 5C

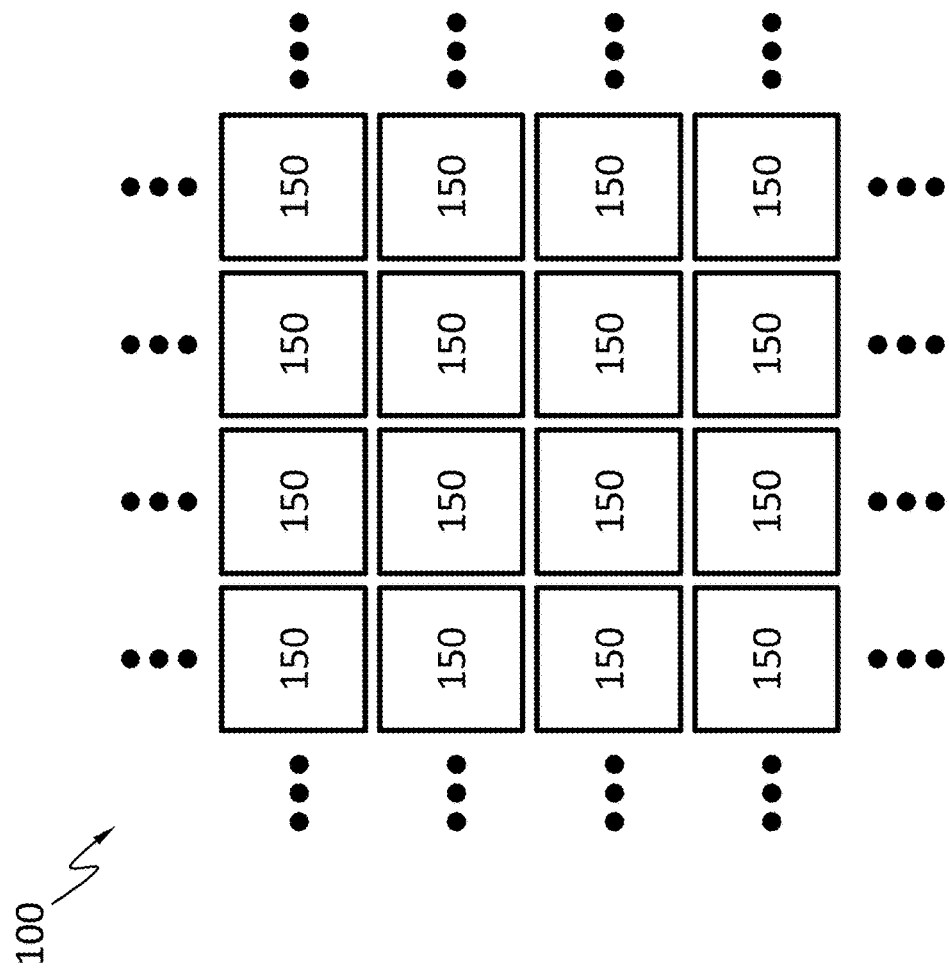

IMAGING SYSTEM CONFIGURED TO STATISTICALLY DETERMINE CHARGE SHARING

TECHNICAL FIELD

The disclosure herein relates to an imaging system that is capable of statistically determining charge sharing.

BACKGROUND

An imaging system detects and conveys the information that constitutes an image. An imaging system may do so by producing a signal that represents location-dependence of a characteristic (e.g., the intensity, phase, and polarization) of radiation after the radiation has interacted with a subject. For example, the radiation detected by the imaging system may be a radiation that has penetrated or reflected from the subject. The signal may be an electric signal such as an electric voltage or current. The radiation an imaging system may detect is not limited visible light, but can be electromagnetic radiation in other wavelengths (e.g., infrared, ultraviolet, X-ray, γ-ray) or non-electromagnetic radiation (e.g., α-ray and β-ray). An imaging system at least should have a radiation detector with spatial resolution. An imaging system may also have a radiation source.

One type of radiation detectors is based on interaction between the radiation and a semiconductor. For example, a radiation detector of this type may have a semiconductor layer that absorbs the radiation and generate charge carriers (e.g., electrons and holes) and circuitry for detecting the charge carriers. As used herein, the term "charge carriers," "charges" and "carriers" are used interchangeably. A radiation detector may have multiple pixels that can independently determine the local characteristic of the incident radiation. The charge carriers generated by the radiation may be swept under an electric field into the pixels. If the charge carriers generated by a single particle (e.g., photon) of the radiation are collected by more than one pixel ("charge sharing"), the performance of the radiation detector may be negatively impacted.

SUMMARY

Disclosed herein is a method comprising: exposing an imaging system to a scene of a radiation, the imaging system comprising a radiation detector, wherein a probability of having two or more particles of the radiation from the scene incident on an area of the radiation detector during a frame within a time period of detection is below a threshold; detecting particles of the radiation from the scene with the imaging system; determining whether the imaging system detects signals caused by the radiation from the scene at two or more locations in the area within the frame; with determination that the imaging system detects signals caused by the radiation from the scene at two or more locations in the area within the frame, combining signals in the area as a combined signal, and recording the combined signal; with determination that the imaging system detects signals caused by the radiation from the scene at only one location in the area within the frame, recording signals in the area; after an end of the time period of detection, forming an image with signals recorded.

Disclosed herein is a method comprising: exposing an imaging system to a scene of a radiation, the imaging system comprising a radiation detector, wherein a probability of having two or more particles of the radiation from the scene incident on an area of the radiation detector during a frame within a time period of detection is below a threshold; detecting particles of the radiation from the scene with the imaging system; determining whether the imaging system detects signals caused by the radiation from the scene at two or more locations in the area within the frame; with determination that the imaging system detects signals caused by the radiation from the scene at two or more locations in the area within the frame, disregarding signals in the area; with determination that the imaging system detects signals caused by the radiation from the scene at only one location in the area within the frame, recording signals in the area; after an end of the time period of detection, forming an image with signals recorded.

According to an embodiment, the threshold is 10%.

According to an embodiment, the radiation is X-ray.

According to an embodiment, the time period of detection comprises a plurality of frames.

According to an embodiment, the imaging system further comprises a pulsed radiation source.

According to an embodiment, the radiation detector is configured to determine whether the pulsed radiation source is at an ON period or an OFF period.

According to an embodiment, the radiation detector is configured to only detect signals during an ON period of the pulsed radiation source.

According to an embodiment, the radiation detector and the pulsed radiation source are synchronized to a same clock.

According to an embodiment, the frame comprises one or more ON periods of the pulsed radiation source.

According to an embodiment, the radiation detector comprises a device configured to detect an intensity of the radiation from the pulsed radiation source as a function of time.

According to an embodiment, the radiation detector comprises a controller.

According to an embodiment, the controller configured to determine that the pulsed radiation source is at one of the ON periods or at one of the OFF periods based on a clock signal from the clock.

According to an embodiment, the controller configured to determine that the pulsed radiation source is at one of the ON periods or at one of the OFF periods based on the intensity of the radiation.

According to an embodiment, the radiation detector further comprises a plurality of pixels and the controller is configured to determine that the pulsed radiation source is at one of the ON periods or at one of the OFF periods, using the pixels.

According to an embodiment, the controller is configured to determine that the pulsed radiation source is at one of the ON periods or at one of the OFF periods, based on a combined signal of a plurality of the pixels.

Disclosed herein is an imaging system comprising: a radiation detector; a pulsed radiation source; wherein a probability of having two or more particles of radiation from the pulsed radiation source incident on an area of the radiation detector during a frame comprising an ON period of the pulsed radiation source is below a threshold; wherein the radiation detector is configured to determine whether the pulsed radiation source is at an ON period or an OFF period.

According to an embodiment, the threshold is 10%.

According to an embodiment, the radiation is X-ray.

According to an embodiment, the radiation detector is configured to only detect signals during an ON period of the pulsed radiation source.

According to an embodiment, the radiation detector comprises a controller.

According to an embodiment, the radiation detector and the pulsed radiation source are synchronized to a same clock.

According to an embodiment, the controller configured to determine that the pulsed radiation source is at one of the ON periods or at one of the OFF periods based on a clock signal from the clock.

According to an embodiment, the radiation detector comprises a device configured to detect an intensity of the radiation from the pulsed radiation source as a function of time.

According to an embodiment, the controller configured to determine that the pulsed radiation source is at one of the ON periods or at one of the OFF periods based on the intensity of the radiation.

According to an embodiment, the radiation detector further comprises a plurality of pixels and the controller is configured to determine that the pulsed radiation source is at one of the ON periods or at one of the OFF periods, using the pixels.

According to an embodiment, the controller is configured to determine that the pulsed radiation source is at one of the ON periods or at one of the OFF periods, based on a combined signal of a plurality of the pixels.

BRIEF DESCRIPTION OF FIGURES

FIG. 2A and FIG. 2C each schematically show an example of the intensity of the radiation emitted by the pulsed radiation source as a function of time.

FIG. 4B schematically shows a flow chart for a method of forming an image using the imaging system disclosed herein.

FIG. 5A schematically shows an embodiment where the radiation detector and the pulsed radiation source are synchronized to the same clock.

FIG. 5B schematically shows an embodiment where the radiation detector has a device configured to detect which period the pulsed radiation source is at.

FIG. 5C schematically shows an embodiment where the radiation detector uses some or all of it pixels to detect which period the pulsed radiation source is at.

FIG. 6 schematically shows a radiation detector suitable for a pulsed radiation source.

DETAILED DESCRIPTION

The imaging system a radiation detector and may have a radiation source, according to an embodiment. The radiation source and the radiation detector may cooperatively cause the imaging system to have the capability of statistically determine whether charge sharing occurs. In an embodiment, the radiation source or the radiation detector may limit the amount of radiation incident on the radiation detector, such that having two or more particles of the radiation incident on the radiation detector during a frame (i.e., a time period during which signals of the radiation detector caused by the radiation are accumulated, measured and reset) within a time period of detection (i.e., a time period during which the radiation detector detects radiation) is statistically improbable. For example, the radiation detector may have a short frame (i.e., the radiation detector accumulates the signals for a short time and measures the signals before resetting the signals); the radiation detector may have a smaller angle of view of the radiation source; the radiation source may be a pulsed radiation source that emits radiation in short pulses.

Figure 1A:
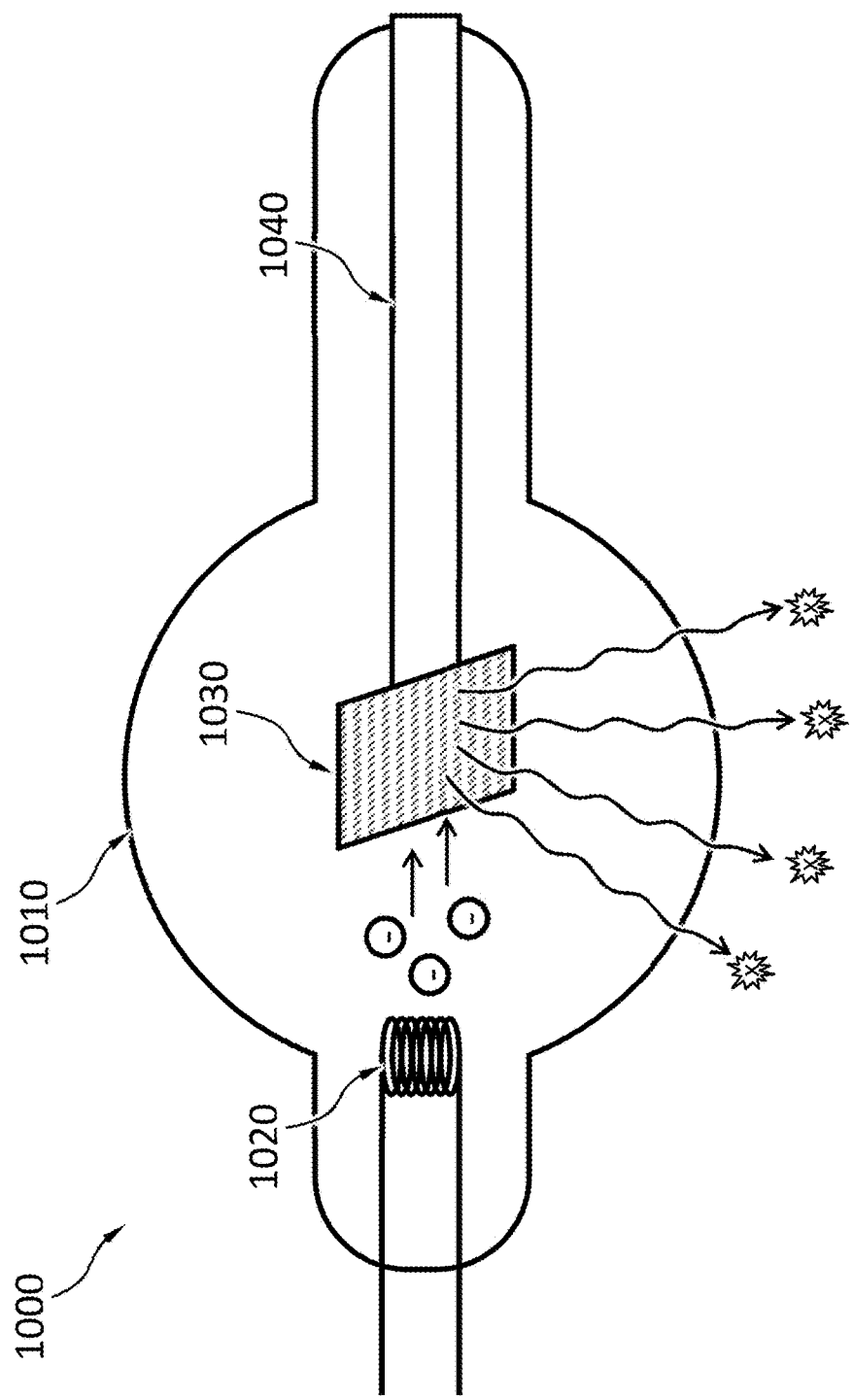
FIG. 1A schematically shows an X-ray tube as an example of a pulsed radiation source.
Figure 1B:
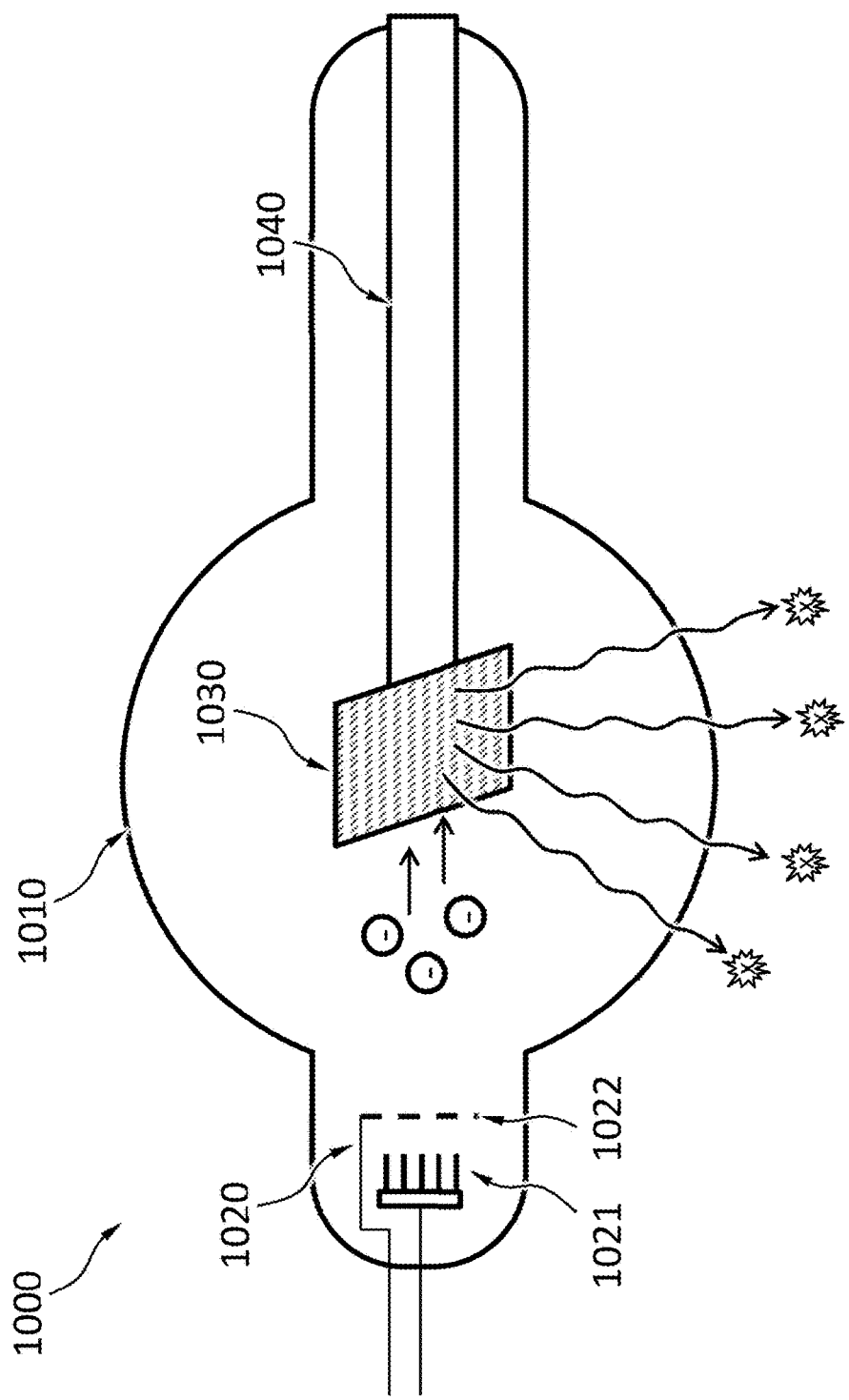
FIG. 1B schematically shows that the cathode of the X-ray tube may include a nanostructured emitter (e.g., carbon nanotubes disposed on a substrate) and a gate electrode.

FIG. 1A schematically shows an X-ray tube 1000 as an example of a pulsed radiation source. The radiation detectors disclosed herein may be used with other pulsed radiation sources. The X-ray tube 1000 has a vacuum tube 1010, a cathode 1020 and anode 1030 housed in the vacuum tube 1010. The cathode 1020 is configured to emit electrons. For example, as shown in FIG. 1A, the cathode 1020 may be a filament of a metal (e.g., tungsten) of high melting point and the emission of the electrons from the filament may be caused by the thermionic effect. For example, as shown in FIG. 1B, the cathode 1020 may include a nanostructured emitter 1021 (e.g., carbon nanotubes disposed on a substrate) and a gate electrode 1022. The nanostructured emitter 1021 and the gate electrode 1022 may have an electric field between them strong enough to cause field emission (FE) of electrons from the nanostructured emitter 1021. A high voltage (e.g., 30 kV to 150 kV) between the cathode 1020 and the anode 1030 establishes an electric field, which accelerates the emitted electrons toward the anode 1030. Examples of the material of the anode 1030 may include tungsten, molybdenum and copper. When the electrons hit the anode 1030, X-ray is emitted from the anode 1030. The emitted X-ray may include a portion having a smooth intensity variation with the wavelength and a portion having several sharp peaks. The first portion is due to deceleration of the electrons (the bremsstrahlung effect) in the anode 1030. The second portion is due to relaxation of electrons at an outer shell of the atoms of the anode 1030 to a lower shell. The X-ray tube 1000 may have a heat sink 1040 thermally connected to the anode 1030.

A pulsed radiation source may emit radiation in pulses. Namely, during operation, the pulsed radiation source emits radiation for a period of time ("ON period") and does not emit radiation for another period of time ("OFF period"). In the example of the X-ray tube here, the pulses of radiation may be caused by pulsing the flow of the electrons from the cathode 1020 to anode 1030. Namely, the flow of the electrons toward the anode 1030 may be on during an ON period and then may be off during an OFF period. The lengths of the ON periods and the OFF periods may be adjustable, for example, by a switch mode power supply.

A switch mode power supply transfers electrical power from a power source (AC or DC) to a load (e.g., the electric field between the anode and cathode of an X-ray tube) using a switching regulator. The switching regulator rapidly switches power to the load on and off. The duty cycle of the switch determines how much power is transferred to the load. The switch regulator has very little power dissipation and thus is very efficient. In contrast, a linear regulator provides the desired output voltage by dissipating excess power in Ohmic losses (i.e., as heat). The switch mode power supply may be able to generate output voltages which are higher than the input, or of opposite polarity.

FIG. 2A schematically shows an example of the intensity of the radiation emitted by the pulsed radiation source as a function of time. The intensity during ON periods 2010 is non-zero and may be substantially constant. The intensity during the OFF periods 2020 may be substantially zero. With all other parameters unchanged, the shorter the ON periods 2010 are, the lower is the probability of having two or more particles of radiation emitted from the pulsed radiation source during a frame reaching a given area (e.g., a single pixel) of the radiation detector.

Figure 2B:
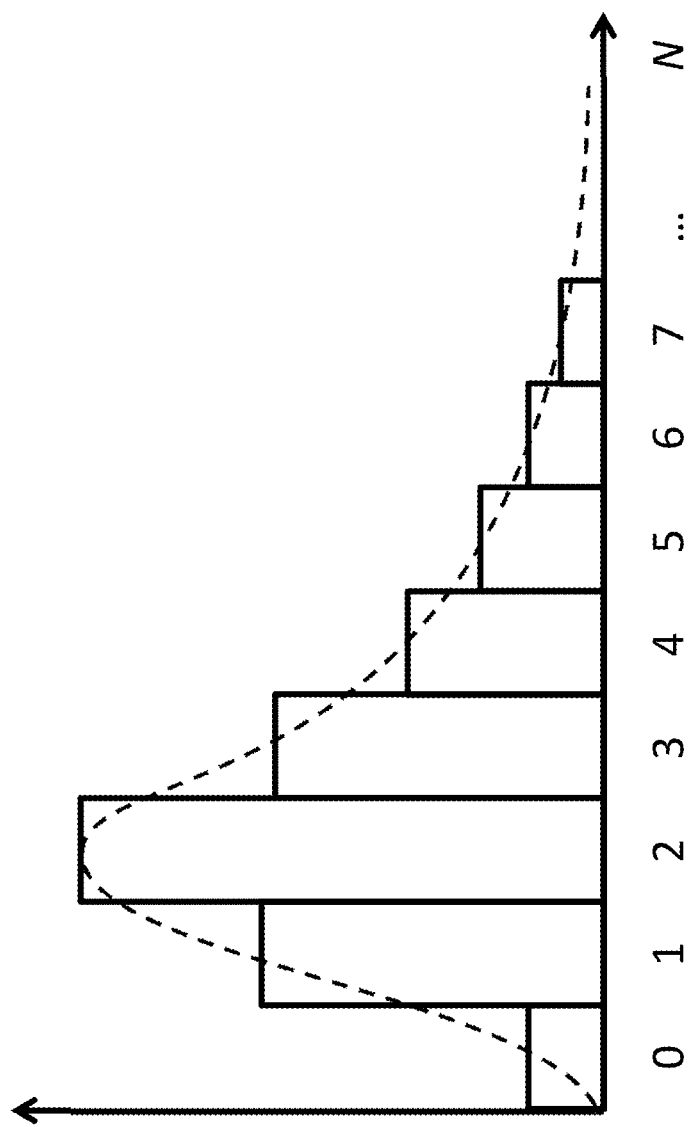
FIG. 2B and FIG. 2D each schematically show a histogram of the number of particles.
Figure 2C:
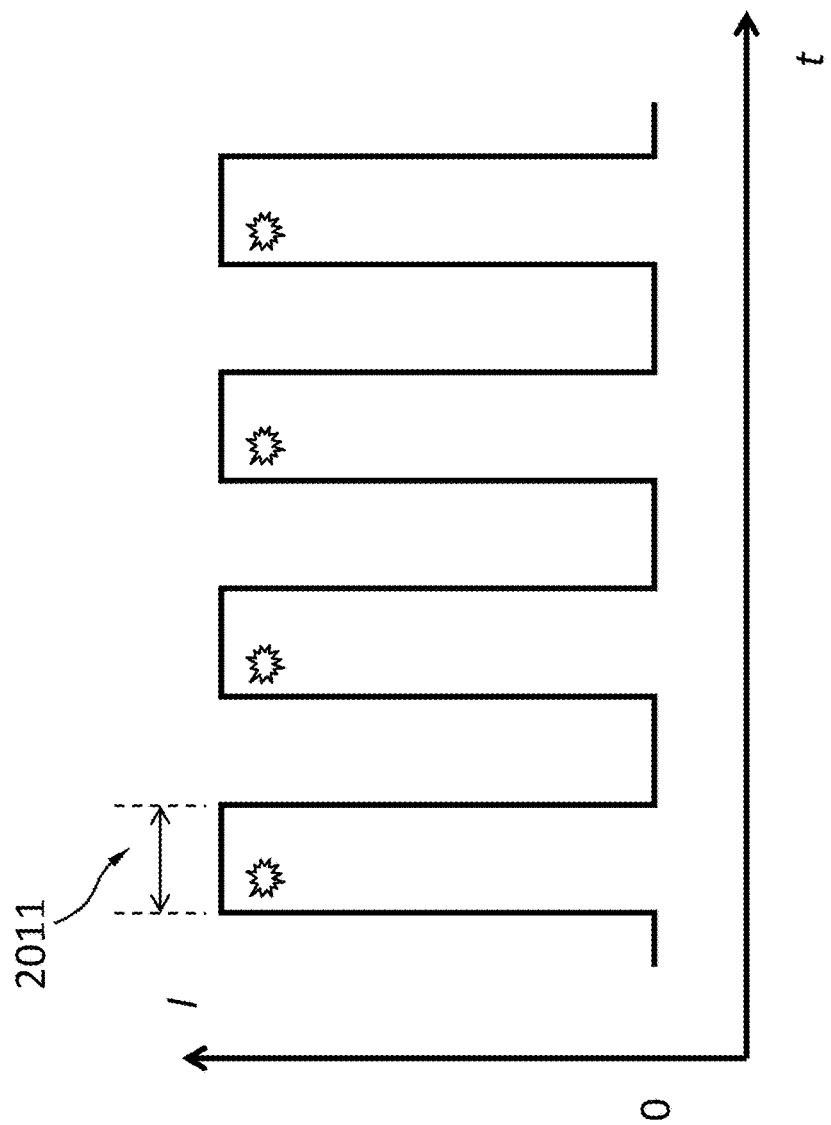
Figure 2D:
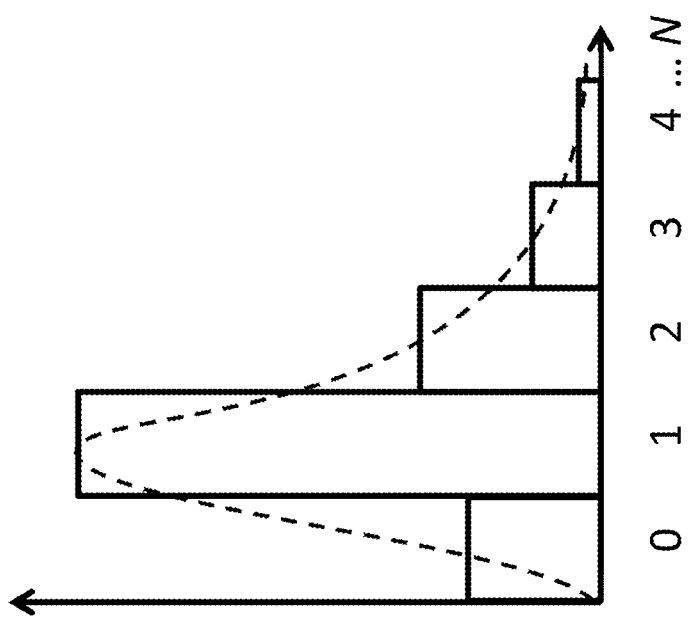

In one example, statistically two particles of the radiation emitted by the pulsed radiation source during each of the ON periods 2010 reach the area of the radiation detector. Namely, the histogram of the number of particles reaching the area of the radiation detector from the radiation source during the ON periods 2010 peaks at two, as shown in FIG. 2B. The phrase "statistically N" means that the probability of number N is higher than the probability of any other number. If the frequency of the pulsed radiation source is doubled, as shown in FIG. 2C, with other parameters of the pulsed radiation source unchanged, the ON periods 2021 are now only half the length of the ON periods 2020. Therefore, during each of the ON periods 2021, statistically one particle of the radiation emitted by the pulsed radiation source during each of the ON periods 2010 reaches the area the radiation detector. Namely, the histogram of the number of particles reaching the area of the radiation detector from the radiation source during the ON periods 2010 peaks near one, as shown in FIG. 2D. If the frame has a length of an ON period plus an OFF period, or less, the number of particles reaching the area during the frame is probably one. Of course the emission of the particles is not uniform as shown in FIG. 2A and FIG. 2C but it remains true that the pulsed radiation source tends to emit fewer particles during shorter ON periods.

Figure 3A:
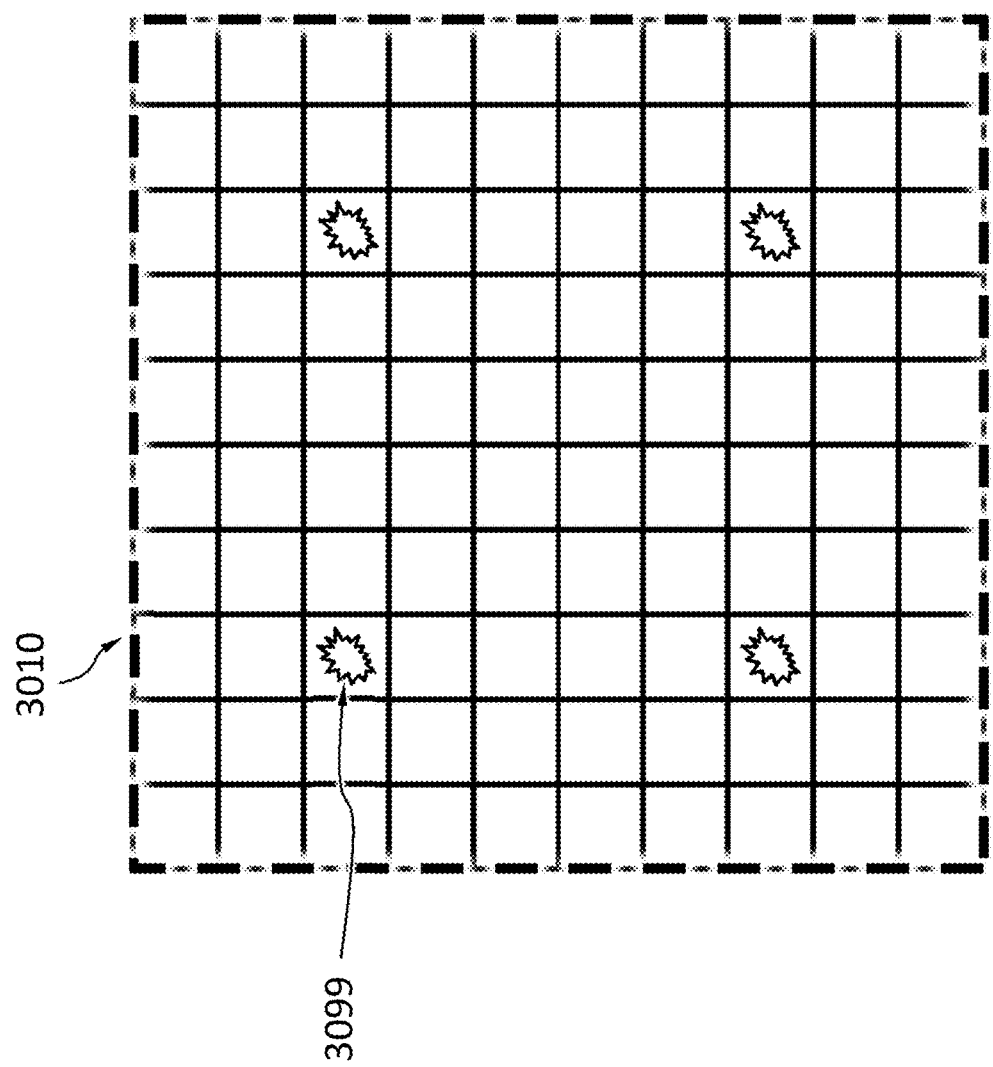
FIG. 3A schematically shows an example of spatial distribution of particles of the radiation from a radiation source reaching an area of the radiation detector, during a given time period.

FIG. 3A schematically shows an example of spatial distribution of particles of the radiation from the radiation source reaching an area of the radiation detector, during a given time period. In this example, statistically four particles 3099 from the radiation source reach the area 3010 of the radiation detector during the time period. Namely, the histogram of the number of particles reaching the area 3010 during the time period peaks at 4.

Figure 3B:
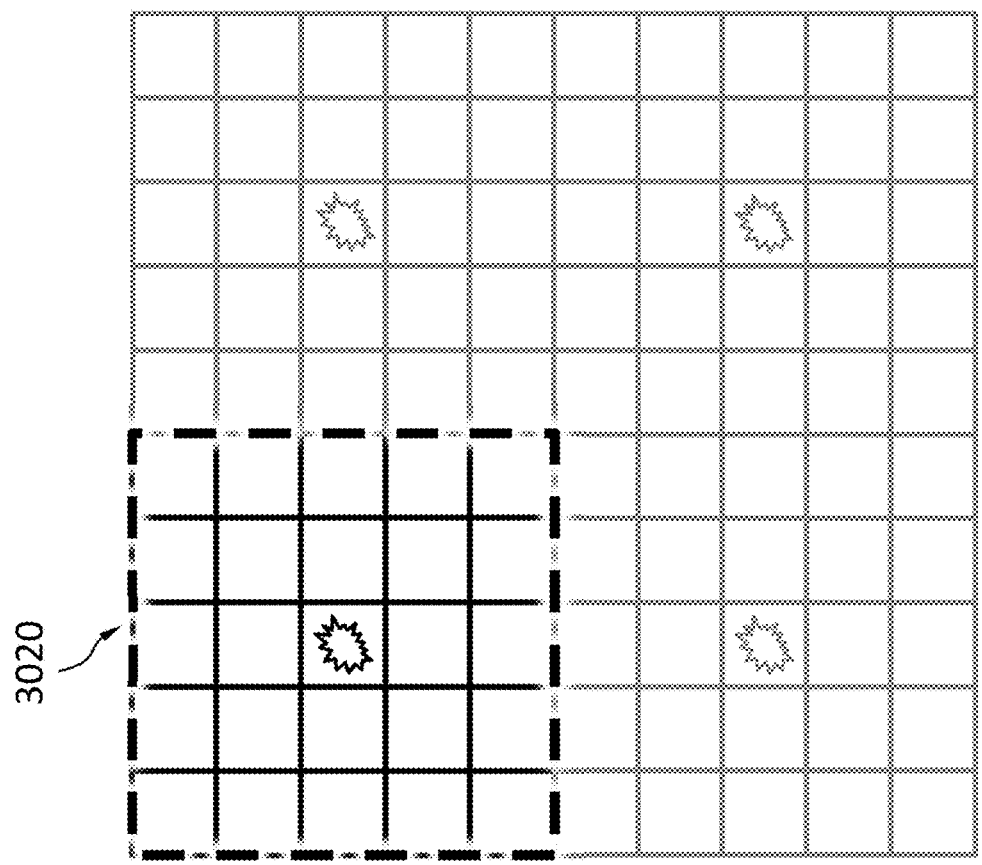
FIG. 3B schematically shows that statistically fewer particles from the radiation source reach a smaller area of the radiation detector during the same time period than the area of FIG. 3A.

FIG. 3B schematically shows that statistically fewer particles from the radiation source reach the area 3020 of the radiation detector during the same time period, where the area 3020 is smaller than the area 3010. In this example, the area 3020 is a quarter in size of the area 3010. Thus, statistically one particle from the radiation source reaches the area 3020 of the radiation detector during the same time period. Namely, the histogram of the number of particles reaching the area 3020 during the time period peaks near 1.

An imaging system having at least a radiation detector may use the low probability of two or more particles of the radiation incident on an area of the radiation detector during a frame within a time period of detection to determine whether charge sharing occurs. When the imagine system is so configured such that the probability of having two or more particles of the radiation incident on an area of the radiation detector during the frame is below a threshold (e.g., <10%, <5%, or <1%), if the detector does detect signals caused by the radiation at two or more locations in the area during the frame (e.g., the voltage outputs of the capacitor modules 309 for two pixels both exceed V1 during an ON period), the detector may conclude that charge sharing occurred. The detector then may discard all signals in the area or may combine all the signals in the area. The imaging system may reduce the probability of two or more particles of the radiation incident on the area of the radiation detector during the frame, for example, by position the detector, by limiting the length of the frame, by limiting the radiation intensity from a radiation source, or by limiting the length of ON periods of a pulsed radiation source.

Figure 4A:
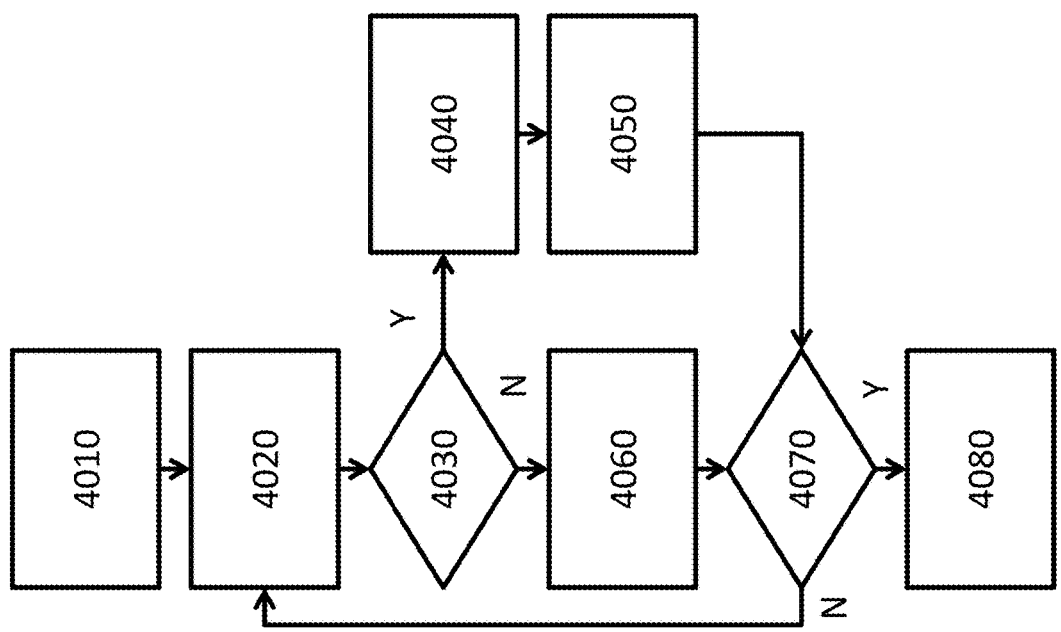
FIG. 4A schematically shows a flow chart for a method of forming an image using the imaging system disclosed herein.

FIG. 4A schematically shows a flow chart for a method of forming an image using the imaging system disclosed herein. In procedure 4010, the imaging system is exposed to a scene of a radiation. The term "a scene of radiation" is a physical environment that includes radiation. The imaging system may form an image that depicts this physical environment. The probability of having two or more particles of the radiation from the scene incident on an area of the radiation detector of the imaging system during a frame within a time period of detection is below a threshold (e.g., <10%, <5%, or <1%). The term "frame" as used herein means a time period during which signals of the radiation detector of the imaging system caused by the radiation are accumulated, measured and reset. If the imaging system uses a pulsed radiation source, the frame may include one or more ON periods. In an embodiment, the frame may be the same length as and synchronized to a single ON period. In procedure 4020, the imaging system detects particles of radiation from the scene. In procedure 4030, it is determined whether the imaging system detects signals caused by the radiation from the scene at two or more locations in the area within the frame. If the imaging system detects signals caused by the radiation from the scene at two or more locations in the area within the frame, the signals in the area are combined as a combined signal, in procedure 4040; the combined signal is recorded in procedure 4050. If the imaging system detects signals caused by the radiation from the scene at only one location in the area within the frame, the signal in the area is recorded in procedure 4060. In procedure 4070, it is determined whether the time period of detection has ended. If the period has not ended, the flow goes back to procedure 4020 and a new frame starts; if the time period of detection has ended, an image is formed with the recorded signals in procedure 4080. The image may be formed by accumulating the recorded signals in multiple frames.

FIG. 4B schematically shows a flow chart for a method of forming an image using the imaging system disclosed herein. In procedure 4010, the imaging system is exposed to a scene of a radiation. The probability of having two or more particles of the radiation from the scene incident on an area of the radiation detector of the imaging system during a frame within a time period of detection is below a threshold (e.g., <10%, <5%, or <1%). If the imaging system uses a pulsed radiation source, the frame may include one or more ON periods. In an embodiment, the frame may be the same length as and synchronized to a single ON period. In procedure 4020, the imaging system detects particles of radiation from the scene. In procedure 4030, it is determined whether the imaging system detects signals caused by the radiation from the scene at two or more locations in the area within the frame. If the imaging system detects signals caused by the radiation from the scene at two or more locations in the area within the frame, the signals in the area are disregarded (e.g., not recorded), in procedure 4045, and the flow returns to procedure 4020 and a new frame starts. If the imaging system detects signals caused by the radiation from the scene at only one location in the area within the frame, the signal in the area is recorded in procedure 4060. In procedure 4070, it is determined whether the time period of detection has ended. If the period has not ended, the flow goes back to procedure 4020; if the time period of detection has ended, an image is formed with the recorded signals in procedure 4080. The image may be formed by accumulating the recorded signals in multiple frames.

If the imaging system uses a pulsed radiation source, the radiation detector may be configured to determine whether the pulsed radiation source is at an ON period or an OFF period. The radiation detector may be configured to only detect signals during an ON period. FIG. 5A schematically shows an embodiment where the radiation detector 8020 and the pulsed radiation source 8010 are synchronized to the same clock 8030. The clock signal from the clock 8030 may be used to determine the lengths of the ON period and the OFF period of the pulsed radiation source 8010. In an X-ray tube as an example of the pulsed radiation source 8010, the clock signal from the clock 8030 may be used to determine the temporal characteristics of the electric field 8011 between the anode and the cathode of the X-ray tube. The clock signal from the clock 8030 is also fed into a controller 8021 of the radiation detector 8020. The controller 8021 may use the clock signal to determine that the pulsed radiation source 8010 is at an ON period or an OFF period, and to determine when to detect signals (e.g., with the pixels 8022 of the radiation detector 8020). The controller 8021 may have a processor and a memory with instructions stored therein, and executing the instructions causes the controller 8021 to perform its functions.

Figure 5B:
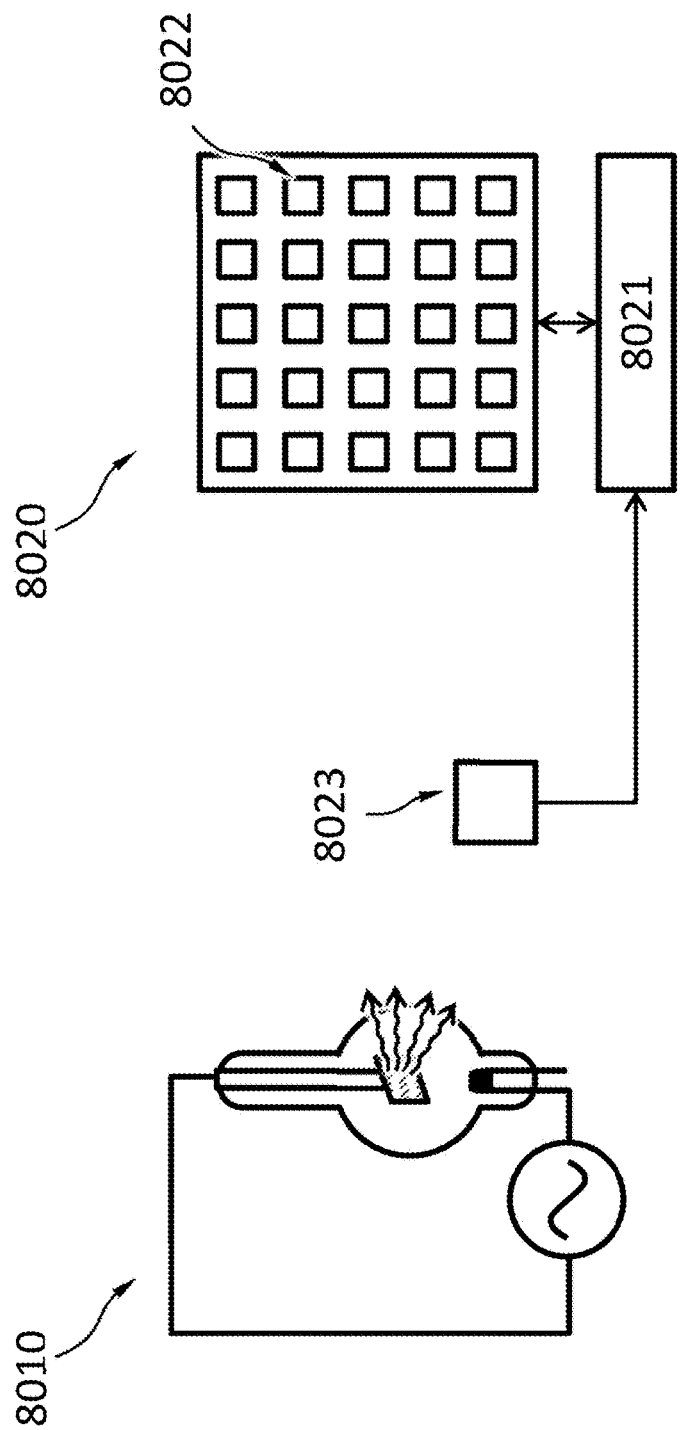

FIG. 5B schematically shows an embodiment where the radiation detector 8020 has a device 8023 configured to detect which period (i.e., an ON period or an OFF period) the pulsed radiation source 8010 is at. Therefore, there is no need to synchronize the pulsed radiation source 8010 and the radiation detector 8020 to the same clock. The device 8023 may detect the intensity of the radiation from the pulsed radiation source 8010 as a function of time. The device may have lower shot noise than the pixels, e.g., by having a larger area than the pixels 8022 of the radiation detector 8020, or by being placed closer to the pulsed radiation source 8010 than the pixels 8022. The device 8023 may lack spatial resolution. The intensity of the radiation detected by the device 8023 may be sent to the controller 8021. The controller 8021 can use the intensity of the radiation detected by the device 8023 to determine that the pulsed radiation source 8010 is at an ON period or an OFF period, and when to detect signals (e.g., with the pixels 8022 of the radiation detector 8020). The device 8023 may continuously detect the intensity of the radiation or do so at a series of time points.

FIG. 5C schematically shows an embodiment where the radiation detector 8020 uses some or all of it pixels 8022 to detect which period the pulsed radiation source 8010 is at. Therefore, there is no need to have the device 8023 or to synchronize the pulsed radiation source 8010 and the radiation detector 8020 to the same clock. In order to reduce the shot noise, the signals of a plurality of the pixels 8022 may be combined. The combined signals represent the intensity of the radiation from the pulsed radiation source 8010 as a function of time. The intensity of the radiation detected by the pixels 8022 may be fed into the controller 8021. The controller 8021 can use the intensity of the radiation to determine that the timing of the ON period and OFF period of the pulsed radiation source 8010, and to when to detect signals (e.g., with the pixels 8022 of the radiation detector 8020). The detection of the period of the pulsed radiation source 8010 may occur at a calibration phase, before a subject is imaged using the radiation source 8010 and the radiation detector 8020.

The exposure of the pixels of the radiation detector may be synchronized. Synchronizing exposure of the pixels is sometimes referred to as "global shuttering." Synchronization of the exposure of the pixels does not necessarily require that the pixels are configured to physically receive radiation during the same period of time; instead, synchronization means that the signals of the pixels are attributable to radiation of the same period of time. For example, Pixel A and Pixel B are still synchronized if Pixel A is configured to physically receive radiation between $t_0$ and $(t_0+2t_1)$, Pixel B is configured to physically receive radiation between $(t_0+t_1)$ and $(t_0+3t_1)$, and the signals of Pixel A and Pixel B are attributable to the radiation they receive between $(t_0+t_1)$ and $(t_0+2t_1)$.

FIG. 6 schematically shows a radiation detector 100 suitable for use in the imaging system, according to an embodiment. The radiation detector 100 has an array of pixels 150. The array may be a rectangular array, a honeycomb array, a hexagonal array or any other suitable array. Each pixel 150 is configured to detect radiation from the pulsed radiation source incident thereon and may be configured measure a characteristic (e.g., the energy of the particles, the wavelength, and the frequency) of the radiation. For example, each pixel 150 is configured to count numbers of photons incident thereon whose energy falls in a plurality of bins, within a period of time. All the pixels 150 may be configured to count the numbers of photons incident thereon within a plurality of bins of energy within the same period of time. Each pixel 150 may have its own analog-to-digital converter (ADC) configured to digitize an analog signal representing the energy of an incident photon into a digital signal. The pixels 150 may be configured to operate in parallel. For example, when one pixel 150 measures an incident photon, another pixel 150 may be waiting for a photon to arrive. The pixels 150 may not have to be individually addressable.

Figure 7A:
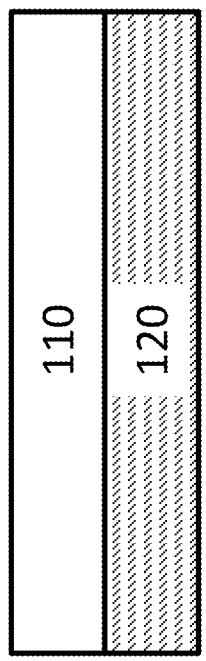
FIG. 7A schematically shows a cross-sectional view of the radiation detector.

FIG. 7A schematically shows a cross-sectional view of the radiation detector 100, according to an embodiment. The radiation detector 100 may include a radiation absorption layer 110 and an electronics layer 120 (e.g., an ASIC) for processing or analyzing electrical signals incident radiation generates in the radiation absorption layer 110. In an embodiment, the detector 100 does not comprise a scintillator. The radiation absorption layer 110 may include a semiconductor material such as, silicon, germanium, GaAs, CdTe, CdZnTe, or a combination thereof. The semiconductor may have a high mass attenuation coefficient for the radiation of interest.

Figure 7B:
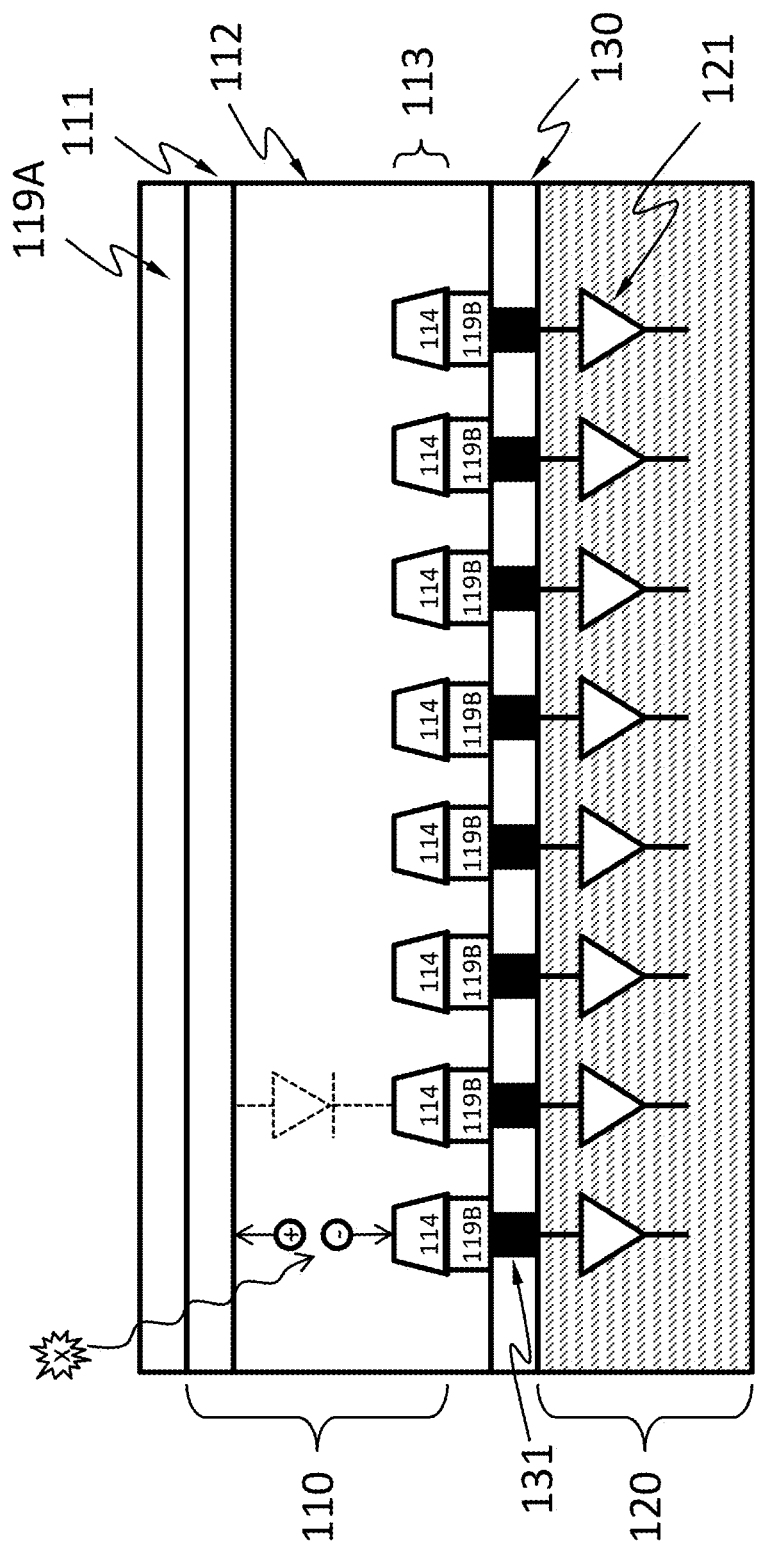
FIG. 7B schematically shows a detailed cross-sectional view of the radiation detector.

As shown in a detailed cross-sectional view of the radiation detector 100 in FIG. 7B, according to an embodiment, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete portions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 7B, each of the discrete regions 114 of the second doped region 113 forms a diode with the first doped region 111 and the optional intrinsic region 112. Namely, in the example in FIG. 7B, the radiation absorption layer 110 has a plurality of diodes having the first doped region 111 as a shared electrode. The first doped region 111 may also have discrete portions.

When radiation from the pulsed radiation source hits the radiation absorption layer 110 including diodes, the radiation photon may be absorbed and generate one or more charge carriers by a number of mechanisms. The charge carriers may drift to the electrodes of one of the diodes under an electric field. The field may be an external electric field. The electrical contact 119B may include discrete portions each of which is in electrical contact with the discrete regions 114. In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel.

Figure 7C:
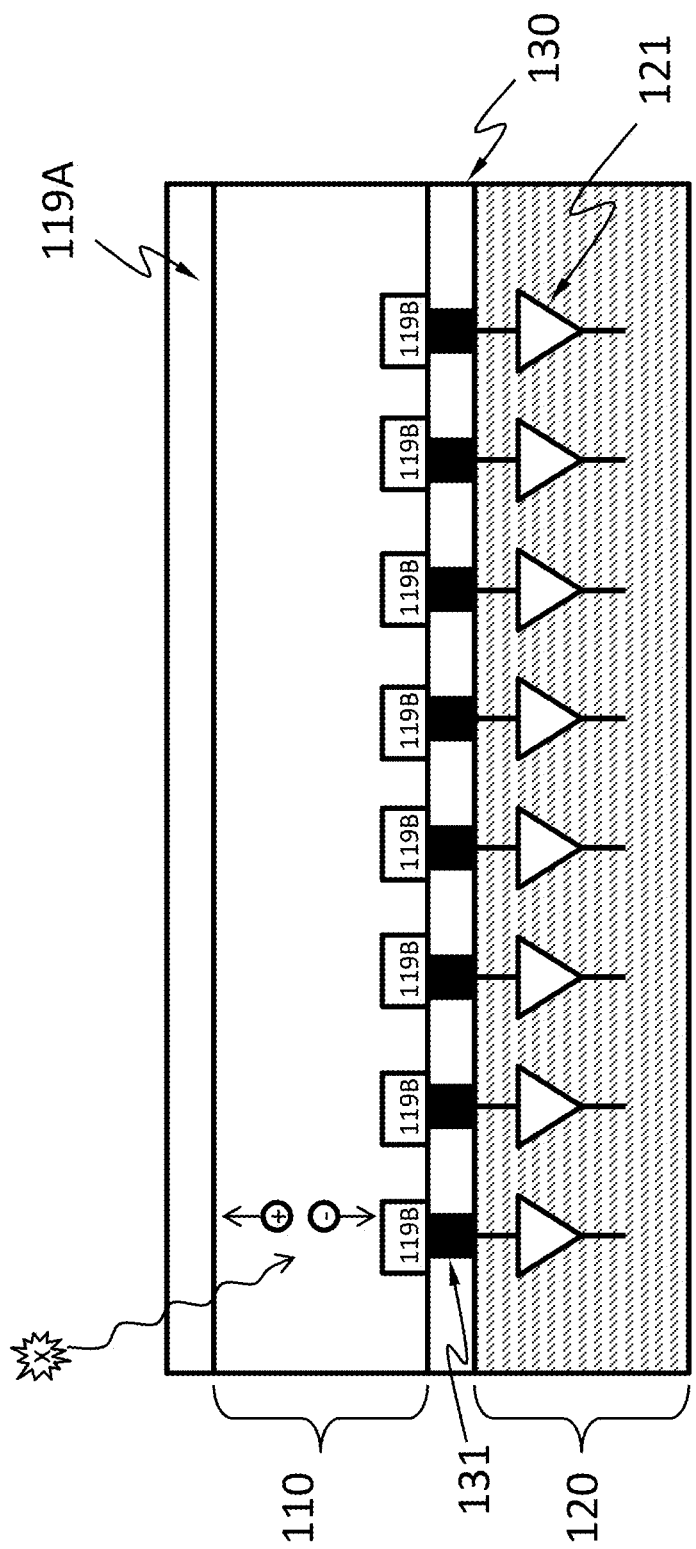
FIG. 7C schematically shows an alternative detailed cross-sectional view of the radiation detector.

As shown in an alternative detailed cross-sectional view of the radiation detector 100 in FIG. 7C, according to an embodiment, the radiation absorption layer 110 may include a resistor of a semiconductor material such as, silicon, germanium, GaAs, CdTe, CdZnTe, or a combination thereof, but does not include a diode. The semiconductor may have a high mass attenuation coefficient for the radiation of interest.

When the radiation hits the radiation absorption layer 110 including a resistor but not diodes, it may be absorbed and generate one or more charge carriers by a number of mechanisms. A particle of the radiation may generate 10 to 100000 charge carriers. The charge carriers may drift to the electrical contacts 119A and 119B under an electric field. The field may be an external electric field. The electrical contact 119B includes discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

The electronics layer 120 may include an electronic system 121 suitable for processing or interpreting signals generated by the radiation incident on the radiation absorption layer 110. The electronic system 121 may include an analog circuitry such as a filter network, amplifiers, integrators, and comparators, or a digital circuitry such as a microprocessors, and memory. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the radiation absorption layer 110. Other bonding techniques are possible to connect the electronic system 121 to the pixels without using vias.

Figure 8A:
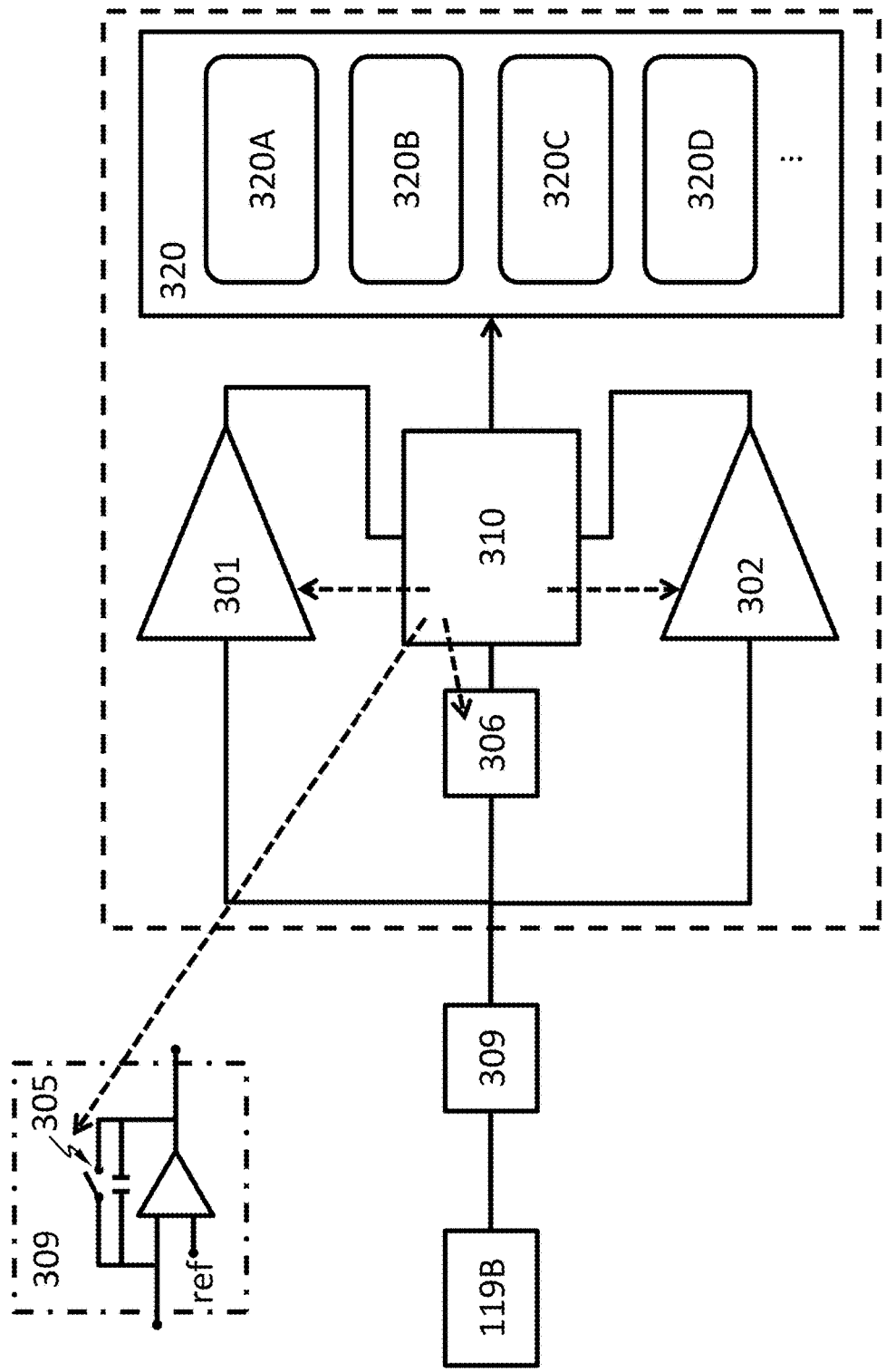
FIG. 8A and FIG. 8B each show a component diagram of the electronic system of the detector, according to an embodiment.
Figure 8B:
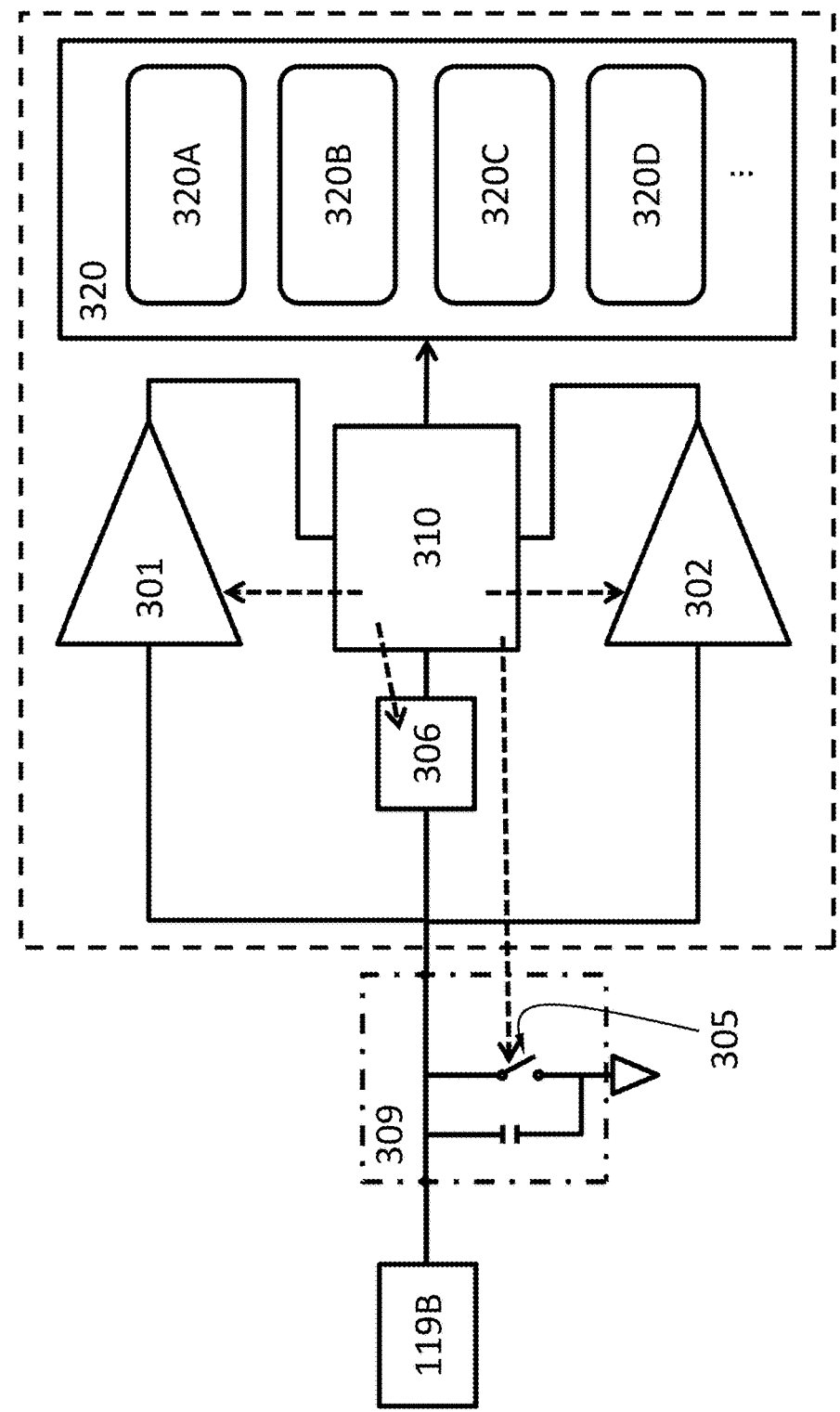

FIG. 8A and FIG. 8B each show a component diagram of the electronic system 121, according to an embodiment. The electronic system 121 may include a first voltage comparator 301, a second voltage comparator 302, a plurality of counters 320 (including counters 320A, 320B, 320C, 320D . . . ), a switch 305, an ADC 306 and a controller 310.

The first voltage comparator 301 is configured to compare the voltage of a discrete portion of the electric contact 119B to a first threshold. The first voltage comparator 301 may be configured to monitor the voltage directly, or calculate the voltage by integrating an electric current flowing through the diode or electrical contact over a period of time. The first voltage comparator 301 may be controllably activated or deactivated by the controller 310. The first voltage comparator 301 may be a continuous comparator. Namely, the first voltage comparator 301 may be configured to be activated continuously, and monitor the voltage continuously. The first voltage comparator 301 configured as a continuous comparator reduces the chance that the system 121 misses signals generated by an incident particle of the radiation. The first voltage comparator 301 configured as a continuous comparator is especially suitable when the incident radiation intensity is relatively high. The first voltage comparator 301 may be a clocked comparator, which has the benefit of lower power consumption. The first voltage comparator 301 configured as a clocked comparator may cause the system 121 to miss signals generated by some incident particles of the radiation. When the incident radiation intensity is low, the chance of missing an incident particle of the radiation is low because the time interval between two successive photons is relatively long. Therefore, the first voltage comparator 301 configured as a clocked comparator is especially suitable when the incident radiation intensity is relatively low. The first threshold may be 1-5%, 5-10%, 10%-20%, 20-30%, 30-40% or 40-50% of the maximum voltage one incident particle of the radiation may generate on the electric contact 119B. The maximum voltage may depend on the energy of the incident particle of the radiation (i.e., the wavelength of the incident radiation), the material of the radiation absorption layer 110, and other factors. For example, the first threshold may be 50 mV, 100 mV, 150 mV, or 200 mV.

The second voltage comparator 302 is configured to compare the voltage to a second threshold. The second voltage comparator 302 may be configured to monitor the voltage directly, or calculate the voltage by integrating an electric current flowing through the diode or the electrical contact over a period of time. The second voltage comparator 302 may be a continuous comparator. The second voltage comparator 302 may be controllably activate or deactivated by the controller 310. When the second voltage comparator 302 is deactivated, the power consumption of the second voltage comparator 302 may be less than 1%, less than 5%, less than 10% or less than 20% of the power consumption when the second voltage comparator 302 is activated. The absolute value of the second threshold is greater than the absolute value of the first threshold. As used herein, the term "absolute value" or "modulus" |x| of a real number x is the non-negative value of x without regard to its sign. Namely, $$|x| = \begin{cases} x, & \text{if } x \geq 0 \\ -x, & \text{if } x \leq 0 \end{cases}.$$

The second threshold may be 200%-300% of the first threshold. For example, the second threshold may be 100 mV, 150 mV, 200 mV, 250 mV or 300 mV. The second voltage comparator 302 and the first voltage comparator 310 may be the same component. Namely, the system 121 may have one voltage comparator that can compare a voltage with two different thresholds at different times.

The first voltage comparator 301 or the second voltage comparator 302 may include one or more op-amps or any other suitable circuitry. The first voltage comparator 301 or the second voltage comparator 302 may have a high speed to allow the system 121 to operate under a high flux of incident radiation. However, having a high speed is often at the cost of power consumption.

The counters 320 may be a software component (e.g., numbers stored in a computer memory) or a hardware component (e.g., 4017 IC and 7490 IC). Each counter 320 is associated with a bin for an energy range. For example, counter 320A may be associated with a bin for 70-71 KeV, counter 320B may be associated with a bin for 71-72 KeV, counter 320C may be associated with a bin for 72-73 KeV, counter 320D may be associated with a bin for 73-74 KeV. When the energy of an incident particle of the radiation is determined by the ADC 306 to be in the bin a counter 320 is associated with, the number registered in the counter 320 is increased by one.

The controller 310 may be a hardware component such as a microcontroller and a microprocessor. The controller 310 is configured to start a time delay from a time at which the first voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electrical contact is used. The controller 310 may be configured to keep deactivated the second voltage comparator 302, the counter 320 and any other circuits the operation of the first voltage comparator 301 does not require, before the time at which the first voltage comparator 301 determines that the absolute value of the voltage equals or exceeds the absolute value of the first threshold. The time delay may expire after the voltage becomes stable, i.e., the rate of change of the voltage is substantially zero. The phase "the rate of change is substantially zero" means that temporal change is less than 0.1%/ns. The phase "the rate of change is substantially non-zero" means that temporal change of the voltage is at least 0.1%/ns.

The controller 310 may be configured to activate the second voltage comparator during (including the beginning and the expiration) the time delay. In an embodiment, the controller 310 is configured to activate the second voltage comparator at the beginning of the time delay. The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 1000 times higher) than the non-operational state. The controller 310 itself may be deactivated until the output of the first voltage comparator 301 activates the controller 310 when the absolute value of the voltage equals or exceeds the absolute value of the first threshold.

The controller 310 may be configured to cause the number registered by one of the counters 320 to increase by one, if, during the time delay, the second voltage comparator 302 determines that the absolute value of the voltage equals or exceeds the absolute value of the second threshold, and the energy of the particle of the radiation falls in the bin associated with the counter 320.

The controller 310 may be configured to cause the ADC 306 to digitize the voltage upon expiration of the time delay and determine based on the voltage which bin the energy of the particle of the radiation falls in.

The controller 310 may be configured to connect the electric contact 119B to an electrical ground, so as to reset the voltage and discharge any charge carriers accumulated on the electric contact 119B. In an embodiment, the electric contact 119B is connected to an electrical ground after the expiration of the time delay. In an embodiment, the electric contact 119B is connected to an electrical ground for a finite reset time period. The controller 310 may connect the electric contact 119B to the electrical ground by controlling the switch 305. The switch may be a transistor such as a field-effect transistor (FET).

In an embodiment, the system 121 has no analog filter network (e.g., a RC network). In an embodiment, the system 121 has no analog circuitry.

The ADC 306 may feed the voltage it measures to the controller 310 as an analog or digital signal. The ADC may be a successive-approximation-register (SAR) ADC (also called successive approximation ADC). An SAR ADC digitizes an analog signal via a binary search through all possible quantization levels before finally converging upon a digital output for the analog signal. An SAR ADC may have four main subcircuits: a sample and hold circuit to acquire the input voltage ($V_{in}$), an internal digital-analog converter (DAC) configured to supply an analog voltage comparator with an analog voltage equal to the digital code output of the successive approximation register (SAR), the analog voltage comparator that compares $V_{in}$ to the output of the internal DAC and outputs the result of the comparison to the SAR, the SAR configured to supply an approximate digital code of $V_{in}$ to the internal DAC. The SAR may be initialized so that the most significant bit (MSB) is equal to a digital 1. This code is fed into the internal DAC, which then supplies the analog equivalent of this digital code ($V_{ref}/2$) into the comparator for comparison with $V_{in}$. If this analog voltage exceeds $V_{in}$ the comparator causes the SAR to reset this bit; otherwise, the bit is left a 1. Then the next bit of the SAR is set to 1 and the same test is done, continuing this binary search until every bit in the SAR has been tested. The resulting code is the digital approximation of $V_{in}$ and is finally output by the SAR at the end of the digitization.

Figure 9:
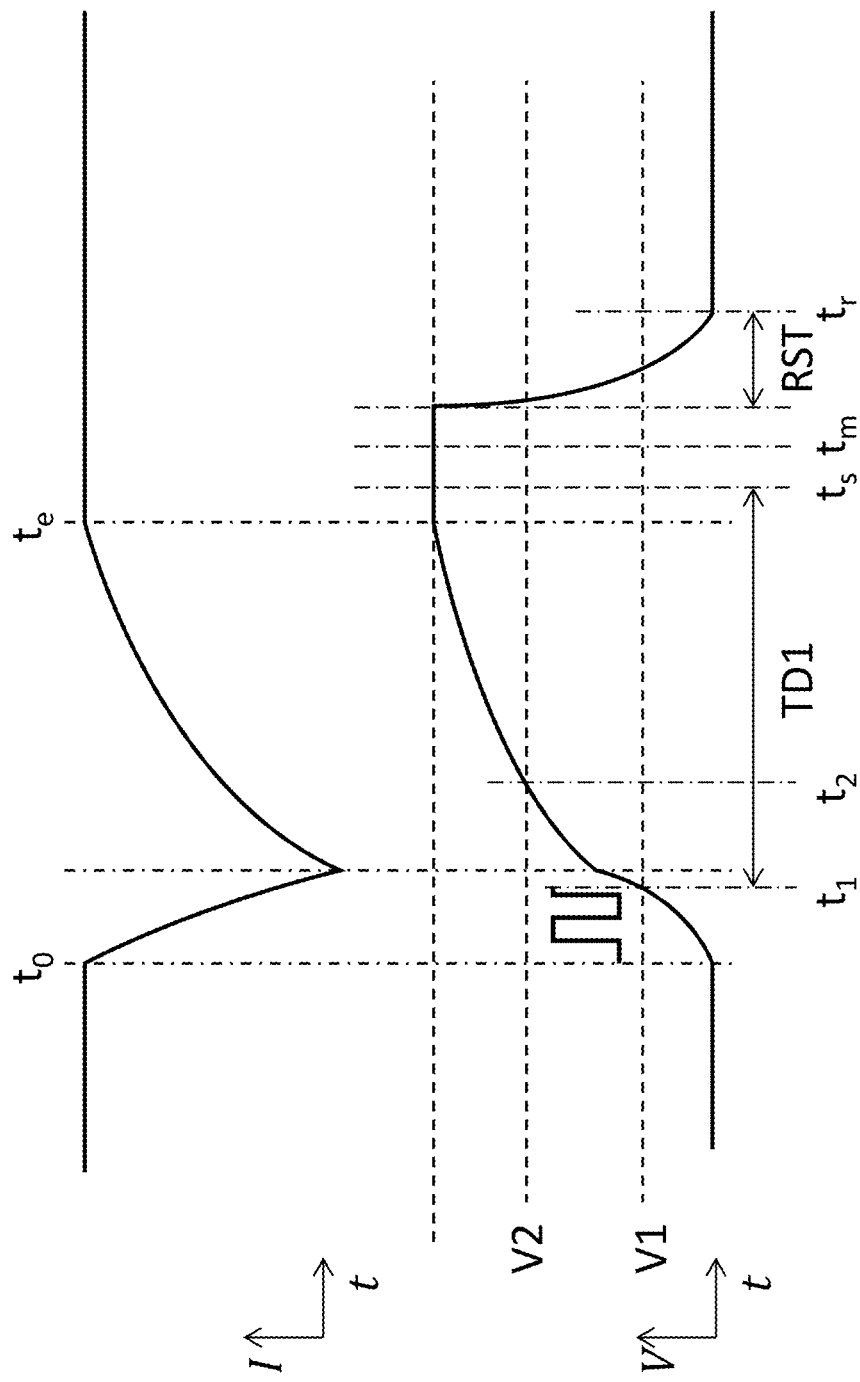
FIG. 9 schematically shows a temporal change of the electric current flowing through an electric contact (upper curve) caused by charge carriers generated by an X-ray photon incident on a pixel associated with the electric contact, and a corresponding temporal change of the voltage of the electric contact (lower curve).

The system 121 may include a capacitor module 309 electrically connected to the electric contact 119B, wherein the capacitor module is configured to collect charge carriers from the electric contact 119B. The capacitor module can include a capacitor in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path. Charge carriers from the electrode accumulate on the capacitor over a period of time ("integration period") (e.g., as shown in FIG. 9, between $t_s$ to $t_0$). After the integration period has expired, the capacitor voltage is sampled by the ADC 306 and then reset by a reset switch. The capacitor module 309 can include a capacitor directly connected to the electric contact 119B.

FIG. 9 schematically shows a temporal change of the electric current flowing through the electric contact 119B (upper curve) caused by charge carriers generated by a particle of the radiation incident on the pixel 150 associated with the electric contact 119B, and a corresponding temporal change of the voltage of the electric contact 119B (lower curve). The voltage may be an integral of the electric current with respect to time. At time $t_0$, the particle of the radiation hits the diode or the resistor, charge carriers start being generated in the pixel 150, electric current starts to flow through the electric contact 119B, and the absolute value of the voltage of the electric contact 119B starts to increase. In the radiation detector described herein, $t_0$ for every pixel may be set to be the beginning of a frame. For example, the switch 305 in FIG. 8A or FIG. 8B may be opened at the beginning of the frame to start signals integration. As an option of determining whether the pixel receives a particle of the radiation during the frame, if the first voltage comparator 301 determines at time $t_1$, that the absolute value of the voltage equals or exceeds the absolute value of the first threshold V1, the pixel is deemed to be receiving a particle of the radiation and the controller 310 starts the time delay TD1 and the controller 310 may deactivate the first voltage comparator 301 at the beginning of TD1. In the radiation detector described herein, the time delay TD1 for every pixel may be the length of an ON period or the frame. If the controller 310 is deactivated before $t_1$, the controller 310 is activated at $t_1$. During TD1, the controller 310 activates the second voltage comparator 302. The term "during" a time delay as used here means the beginning and the expiration (i.e., the end) and any time in between. For example, the controller 310 may activate the second voltage comparator 302 at the expiration of TD1. If during TD1, the second voltage comparator 302 determines that the absolute value of the voltage equals or exceeds the absolute value of the second threshold V2 at time $t_2$, the controller 310 waits for stabilization of the voltage. The voltage stabilizes at time $t_e$, when all charge carriers generated by the particle of the radiation drift out of the radiation absorption layer 110. At time $t_s$, the time delay TD1 expires. At or after time $t_e$, the controller 310 causes the ADC 306 to digitize the voltage and determines which bin the energy of the particles of the radiation falls in. The controller 310 then causes the number registered by the counter 320 corresponding to the bin to increase by one. In the example of FIG. 9, time $t_s$ is after time $t_e$; namely TD1 expires after all charge carriers generated by the particle of the radiation drift out of the radiation absorption layer 110. If time $t_e$ cannot be easily measured, TD1 can be empirically chosen to allow sufficient time to collect essentially all charge carriers generated by a particle of the radiation but not too long to risk have another incident particle of the radiation. Namely, TD1 can be empirically chosen so that time $t_s$ is empirically after time $t_e$. Time $t_s$ is not necessarily after time $t_e$ because the controller 310 may disregard TD1 once V2 is reached and wait for time $t_e$. The rate of change of the difference between the voltage and the contribution to the voltage by the dark current is thus substantially zero at $t_e$. The controller 310 may be configured to deactivate the second voltage comparator 302 at expiration of TD1 or at $t_2$, or any time in between.

As another option of determining whether the pixel receives a particle of the radiation during the frame, the controller 310 starts the time delay TD1 at the beginning of the frame, without comparing the voltage to V1. Instead, at the expiration of the time delay TD1, if it is determined (e.g., by the second voltage comparator 302) that the absolute value of the voltage equals or exceeds V2, the pixel is deemed to be receiving a particle of the radiation and the controller 310 waits for stabilization of the voltage. The voltage stabilizes at time $t_e$, when all charge carriers generated by the particle of the radiation drift out of the radiation absorption layer 110. At or after time $t_e$, the controller 310 causes the ADC 306 to digitize the voltage and determines which bin the energy of the particles of the radiation falls in. The controller 310 then causes the number registered by the counter 320 corresponding to the bin to increase by one.

The voltage at time $t_e$ is proportional to the amount of charge carriers generated by the particle of the radiation, which relates to the energy of the particle of the radiation. The controller 310 may be configured to determine the bin the energy of the particle of the radiation falls in, based on the output of the ADC 306.

After TD1 expires or digitization by the ADC 306, whichever later, the controller 310 connects the electric contact 119B to an electric ground for a reset period RST to allow charge carriers accumulated on the electric contact 119B to flow to the ground and reset the voltage. In the radiation detector described herein, the reset period RST for every pixel may begin at the same time and end at the same time. For example, the reset period RST may be an entire OFF period. The switch 305 in FIG. 8A or FIG. 8B may be closed during the reset period RST. After RST, the system 121 is ready to detect another incident particle of the radiation. If the first voltage comparator 301 has been deactivated, the controller 310 can activate it at any time before RST expires. If the controller 310 has been deactivated, it may be activated before RST expires.

Figure 10:
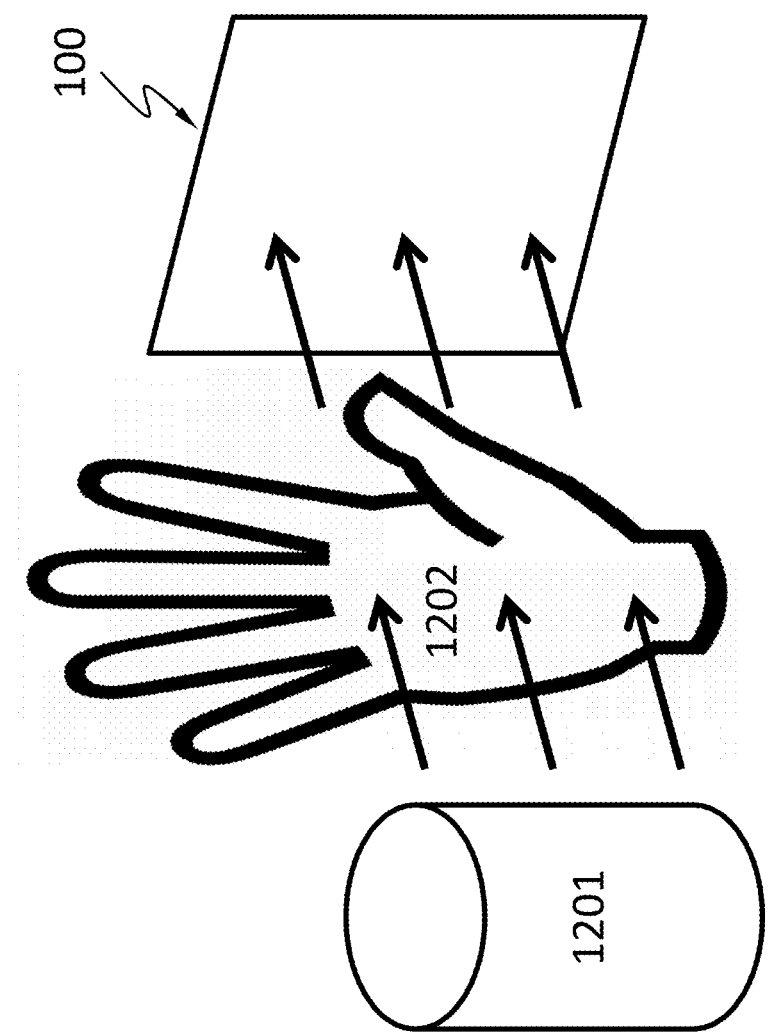
FIG. 10-FIG. 15 each schematically show a system comprising the radiation detector described herein.

FIG. 10 schematically shows a system comprising the radiation detector 100 described herein. The system may be used for medical imaging such as chest X-ray radiography, abdominal X-ray radiography, etc. The system comprises a pulsed radiation source 1201 that emits X-ray. X-ray emitted from the pulsed radiation source 1201 penetrates an object 1202 (e.g., a human body part such as chest, limb, abdomen), is attenuated by different degrees by the internal structures of the object 1202 (e.g., bones, muscle, fat and organs, etc.), and is projected to the radiation detector 100. The radiation detector 100 forms an image by detecting the intensity distribution of the X-ray.

Figure 11:
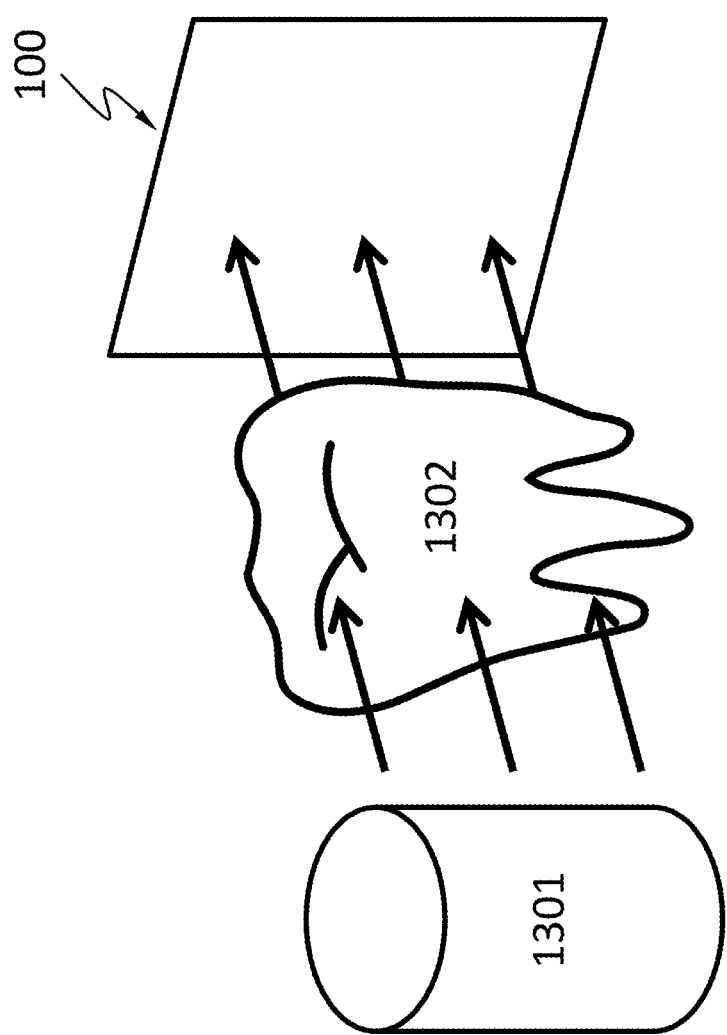

FIG. 11 schematically shows a system comprising the radiation detector 100 described herein. The system may be used for medical imaging such as dental X-ray radiography. The system comprises a pulsed radiation source 1301 that emits X-ray. X-ray emitted from the pulsed radiation source 1301 penetrates an object 1302 that is part of a mammal (e.g., human) mouth. The object 1302 may include a maxilla bone, a palate bone, a tooth, the mandible, or the tongue. The X-ray is attenuated by different degrees by the different structures of the object 1302 and is projected to the radiation detector 100. The radiation detector 100 forms an image by detecting the intensity distribution of the X-ray. Teeth absorb X-ray more than dental caries, infections, periodontal ligament. The dosage of X-ray radiation received by a dental patient is typically small (around 0.150 mSv for a full mouth series).

Figure 12:
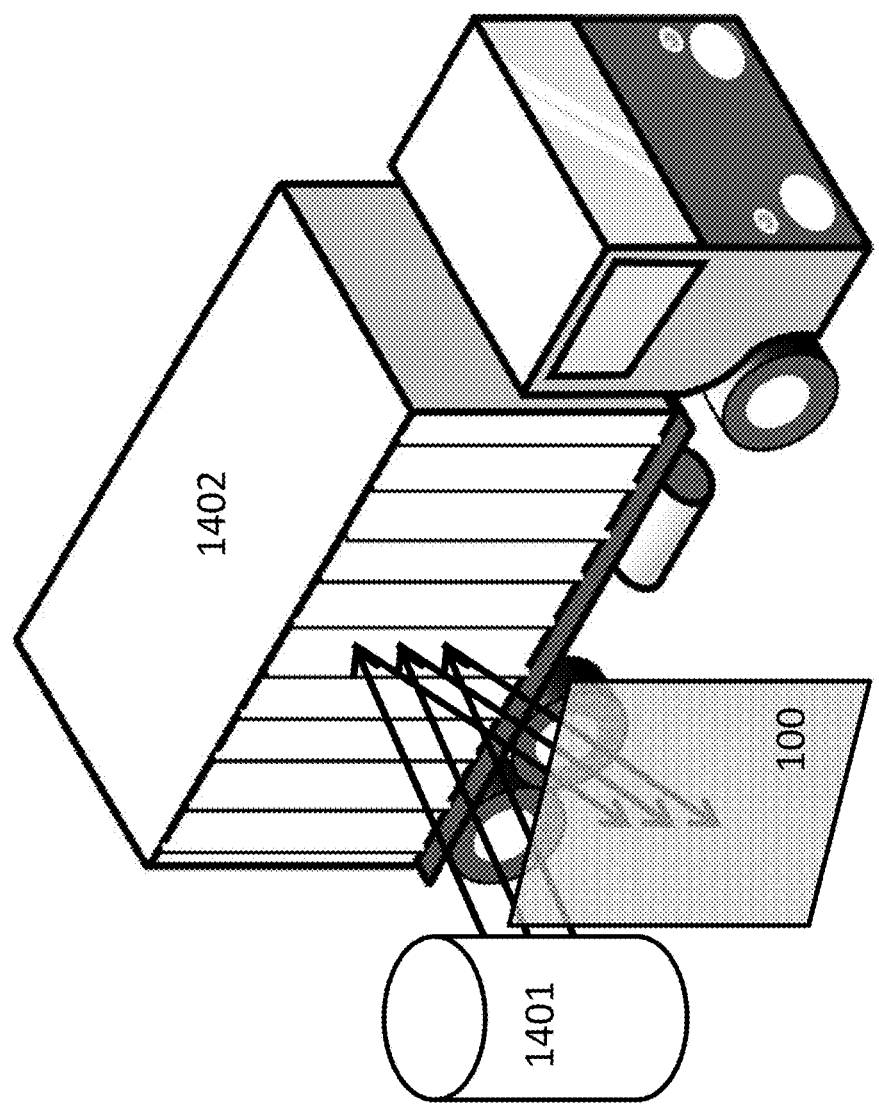

FIG. 12 schematically shows a cargo scanning or non-intrusive inspection (NII) system comprising the radiation detector 100 described herein. The system may be used for inspecting and identifying goods in transportation systems such as shipping containers, vehicles, ships, luggage, etc. The system comprises a pulsed radiation source 1401. Radiation emitted from the pulsed radiation source 1401 may backscatter from an object 1402 (e.g., shipping containers, vehicles, ships, etc.) and be projected to the radiation detector 100. Different internal structures of the object 1402 may backscatter the radiation differently. The radiation detector 100 forms an image by detecting the intensity distribution of the backscattered radiation and/or energies of the backscattered radiation.

Figure 13:
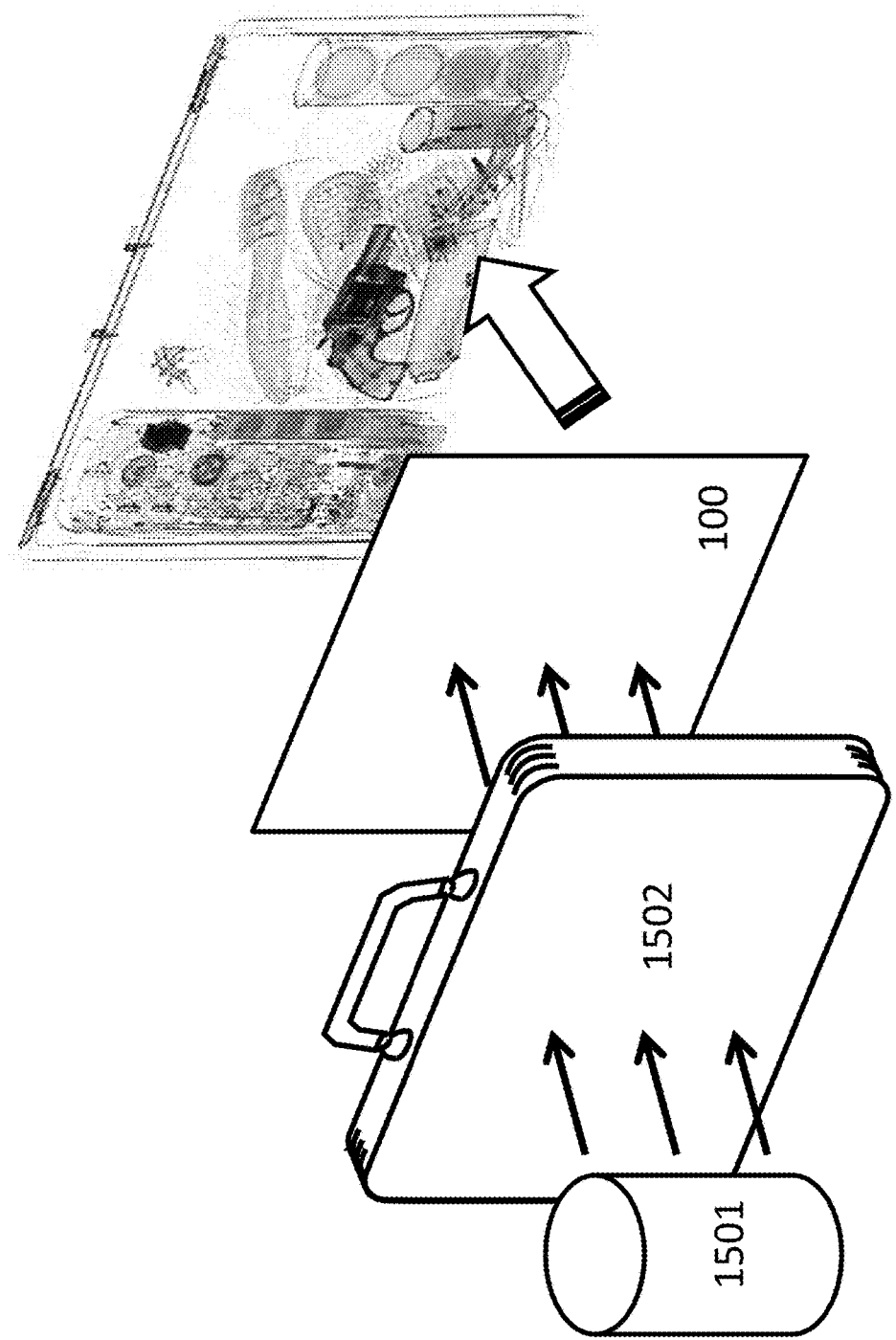

FIG. 13 schematically shows another cargo scanning or non-intrusive inspection (NII) system comprising the radiation detector 100 described herein. The system may be used for luggage screening at public transportation stations and airports. The system comprises a pulsed radiation source 1501 that emits X-ray. X-ray emitted from the pulsed radiation source 1501 may penetrate a piece of luggage 1502, be differently attenuated by the contents of the luggage, and projected to the radiation detector 100. The radiation detector 100 forms an image by detecting the intensity distribution of the transmitted X-ray. The system may reveal contents of luggage and identify items forbidden on public transportation, such as firearms, narcotics, edged weapons, flammables.

Figure 14:
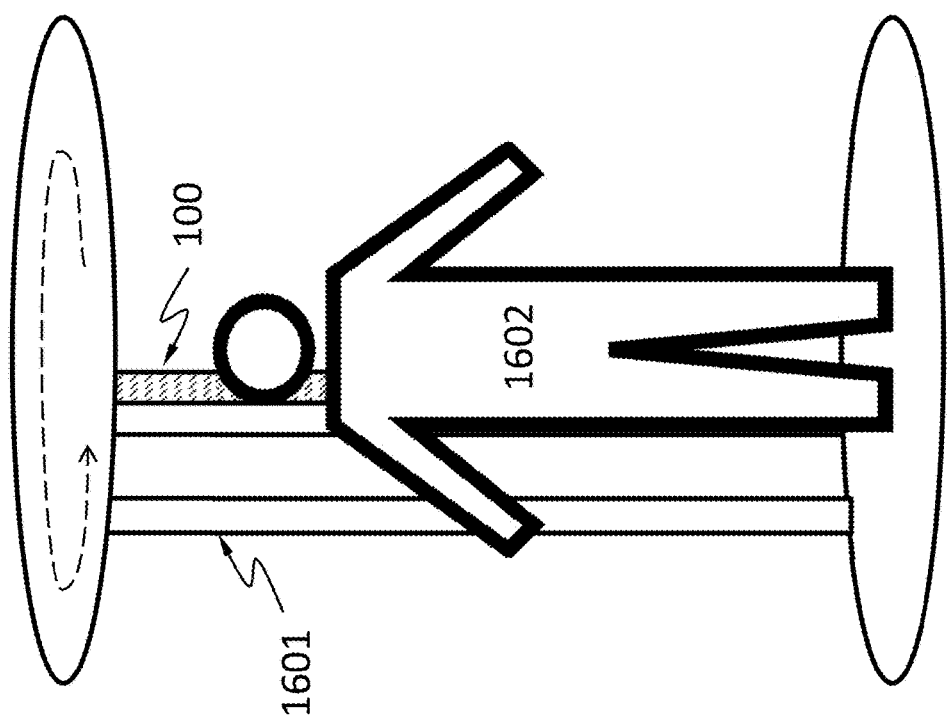

FIG. 14 schematically shows a full-body scanner system comprising the radiation detector 100 described herein. The full-body scanner system may detect objects on a person's body for security screening purposes, without physically removing clothes or making physical contact. The full-body scanner system may be able to detect non-metal objects. The full-body scanner system comprises a pulsed radiation source 1601. The radiation emitted from the pulsed radiation source 1601 may backscatter from a human 1602 being screened and objects thereon, and be projected to the radiation detector 100. The objects and the human body may backscatter the radiation differently. The radiation detector 100 forms an image by detecting the intensity distribution of the backscattered radiation. The radiation detector 100 and the pulsed radiation source 1601 may be configured to scan the human in a linear or rotational direction.

Figure 15:
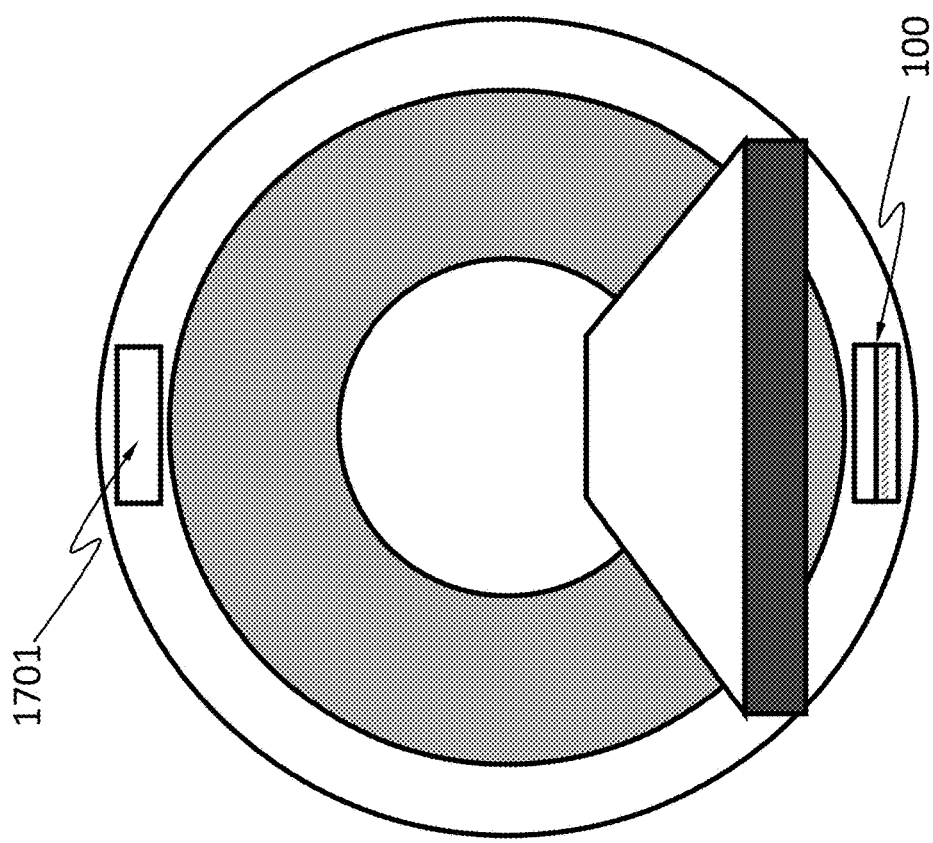

FIG. 15 schematically shows an X-ray computed tomography (X-ray CT) system. The X-ray CT system uses computer-processed X-rays to produce tomographic images (virtual "slices") of specific areas of a scanned object. The tomographic images may be used for diagnostic and therapeutic purposes in various medical disciplines, or for flaw detection, failure analysis, metrology, assembly analysis and reverse engineering. The X-ray CT system comprises the radiation detector 100 described herein and a pulsed radiation source 1701 that emits X-ray. The radiation detector 100 and the pulsed radiation source 1701 may be configured to rotate synchronously along one or more circular or spiral paths.

The pulsed radiation detector 100 described here may have other applications such as in an X-ray telescope, X-ray mammography, industrial X-ray defect detection, X-ray microscopy or microradiography, X-ray casting inspection, X-ray non-destructive testing, X-ray weld inspection, X-ray digital subtraction angiography, etc. It may be suitable to use this pulsed radiation detector 100 in place of a photographic plate, a photographic film, a PSP plate, an X-ray image intensifier, a scintillator, or another semiconductor X-ray detector.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   exposing an imaging system to a scene of a radiation, the imaging system comprising a radiation detector, wherein a probability of having two or more particles of the radiation from the scene incident on an area of the radiation detector during a frame within a time period of detection is below a threshold;
   detecting particles of the radiation from the scene with the imaging system;
   determining whether the imaging system detects signals caused by the radiation from the scene at two or more locations in the area within the frame;
   with determination that the imaging system detects signals caused by the radiation from the scene at two or more locations in the area within the frame, combining signals in the area as a combined signal, and recording the combined signal;
   with determination that the imaging system detects signals caused by the radiation from the scene at only one location in the area within the frame, recording signals in the area;
   after an end of the time period of detection, forming an image with signals recorded.

2. A method comprising:
   exposing an imaging system to a scene of a radiation, the imaging system comprising a radiation detector, wherein a probability of having two or more particles of the radiation from the scene incident on an area of the radiation detector during a frame within a time period of detection is below a threshold;

detecting particles of the radiation from the scene with the imaging system;

determining whether the imaging system detects signals caused by the radiation from the scene at two or more locations in the area within the frame;

with determination that the imaging system detects signals caused by the radiation from the scene at two or more locations in the area within the frame, disregarding signals in the area;

with determination that the imaging system detects signals caused by the radiation from the scene at only one location in the area within the frame, recording signals in the area;

after an end of the time period of detection, forming an image with signals recorded.

3. The method of claim 1 or claim 2, wherein the threshold is 10%.

4. The method of claim 1 or claim 2, wherein the radiation is X-ray.

5. The method of claim 1 or claim 2, wherein the time period of detection comprises a plurality of frames.

6. The method of claim 1 or claim 2, wherein the imaging system further comprises a pulsed radiation source.

7. The method of claim 6, wherein the radiation detector is configured to determine whether the pulsed radiation source is at an ON period or an OFF period.

8. The method of claim 6, wherein the radiation detector is configured to only detect signals during an ON period of the pulsed radiation source.

9. The method of claim 6, wherein the radiation detector and the pulsed radiation source are synchronized to a same clock.

10. The method of claim 6, wherein the frame comprises one or more ON periods of the pulsed radiation source.

11. The method of claim 6, wherein the radiation detector comprises a device configured to detect an intensity of the radiation from the pulsed radiation source as a function of time.

12. The method of claim 6, wherein the radiation detector comprises a controller.

13. The method of claim 12, wherein the radiation detector and the pulsed radiation source are synchronized to a same clock; wherein the controller configured to determine that the pulsed radiation source is at one of the ON periods or at one of the OFF periods based on a clock signal from the clock.

14. The method of claim 12, wherein the controller configured to determine that the pulsed radiation source is at one of the ON periods or at one of the OFF periods based on the intensity of the radiation.

15. The method of claim 12, wherein the radiation detector further comprises a plurality of pixels and wherein the controller is configured to determine that the pulsed radiation source is at one of the ON periods or at one of the OFF periods, using the pixels.

16. The method of claim 15, wherein the controller is configured to determine that the pulsed radiation source is at one of the ON periods or at one of the OFF periods, based on a combined signal of a plurality of the pixels.

17. An imaging system comprising:
a radiation detector;
a pulsed radiation source;
wherein a probability of having two or more particles of radiation from the pulsed radiation source incident on an area of the radiation detector during a frame comprising an ON period of the pulsed radiation source is below a threshold;
wherein the radiation detector is configured to determine whether the pulsed radiation source is at an ON period or an OFF period.

18. The imaging system of claim 17, wherein the threshold is 10%.

19. The imaging system of claim 17, wherein the radiation is X-ray.

20. The imaging system of claim 17, wherein the radiation detector is configured to only detect signals during an ON period of the pulsed radiation source.

21. The imaging system of claim 17, wherein the radiation detector comprises a controller.

22. The imaging system of claim 21, wherein the radiation detector and the pulsed radiation source are synchronized to a same clock; wherein the controller configured to determine that the pulsed radiation source is at one of the ON periods or at one of the OFF periods based on a clock signal from the clock.

23. The imaging system of claim 21, wherein the radiation detector comprises a device configured to detect an intensity of the radiation from the pulsed radiation source as a function of time.

24. The imaging system of claim 23, wherein the controller configured to determine that the pulsed radiation source is at one of the ON periods or at one of the OFF periods based on the intensity of the radiation.

25. The imaging system of claim 21, wherein the radiation detector further comprises a plurality of pixels and wherein the controller is configured to determine that the pulsed radiation source is at one of the ON periods or at one of the OFF periods, using the pixels.

26. The imaging system of claim 25, wherein the controller is configured to determine that the pulsed radiation source is at one of the ON periods or at one of the OFF periods, based on a combined signal of a plurality of the pixels.

27. The imaging system of claim 17, wherein the radiation detector and the pulsed radiation source are synchronized to a same clock.

* * * * *